United States Patent
Boku et al.

[11] Patent Number: 6,055,105
[45] Date of Patent: Apr. 25, 2000

[54] OPTICAL SYSTEM WITH GRATING ELEMENT AND IMAGING DEVICE USING THE SAME

[75] Inventors: Kazutake Boku; Shusuke Ono, both of Osaka, Japan

[73] Assignee: Matsushita Electric Industrial Co., Ltd., Osaka, Japan

[21] Appl. No.: 08/926,048

[22] Filed: Sep. 9, 1997

[30] Foreign Application Priority Data

Sep. 13, 1996 [JP] Japan .................................. 8-243731

[51] Int. Cl.[7] ...................................................... G02B 5/18
[52] U.S. Cl. ........................ 359/566; 359/565; 359/569; 359/570; 359/571; 359/742
[58] Field of Search .................... 359/15, 16, 19, 359/558, 565, 566, 569, 570, 571, 742

[56] References Cited

U.S. PATENT DOCUMENTS 5,260,828 11/1993 Londono et al. ........................ 359/565
5,323,264 6/1994 Kato ........................................ 359/432
5,581,405 12/1996 Meyers et al. ........................... 359/571

FOREIGN PATENT DOCUMENTS 6-242373 9/1994 Japan .
8-43767 2/1996 Japan .

OTHER PUBLICATIONS

William C. Sweatt, "Describing Holographic Optical Elements as Lenses", *Journal of Optical Society of America*, vol. 67, No. 6, pp. 803–808.

*Primary Examiner*—Cassandra Spyrou
*Assistant Examiner*—Craig Curtis
*Attorney, Agent, or Firm*—Merchant & Gould P.C.

[57] ABSTRACT

An optical system that can be used in an optical imaging system and displays good imaging performance with corrected chromatic aberration without increasing the number of lenses is provided by employing a lens surface with a diffractive effect. The optical system uses a lens with a concave incident surface and positive refractive power. A grating element surface 40 with positive refractive power is formed on at least one surface of the lens. The surface on which the grating element is formed is an aspherical surface with a radius of curvature that becomes bigger with increasing distance from the optical axis.

17 Claims, 25 Drawing Sheets

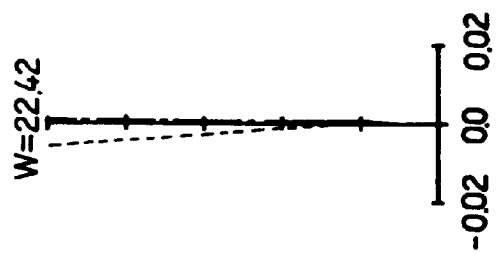
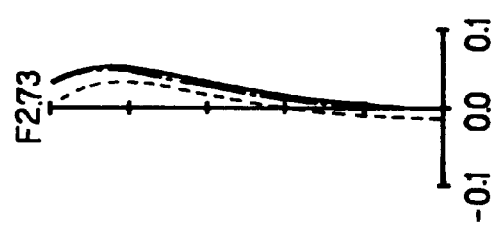
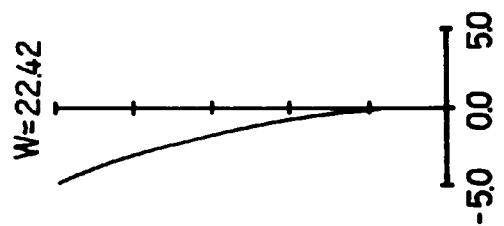
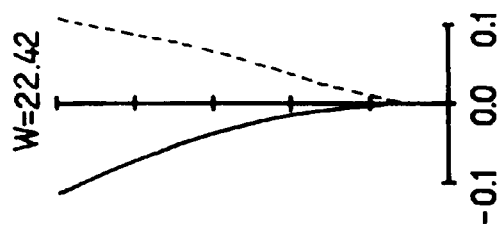
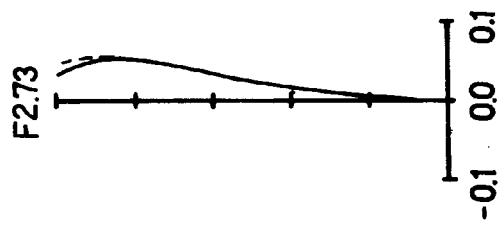

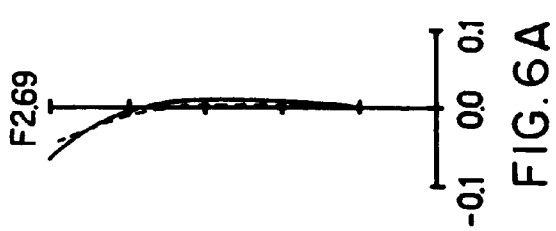
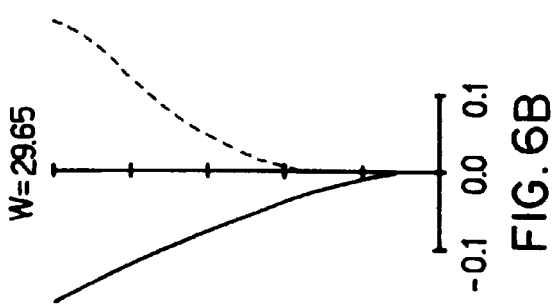
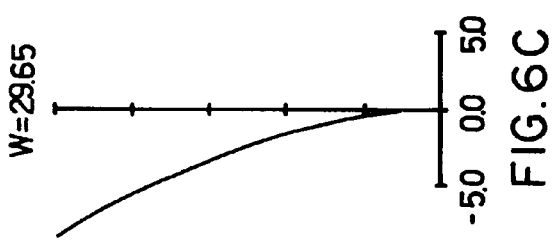
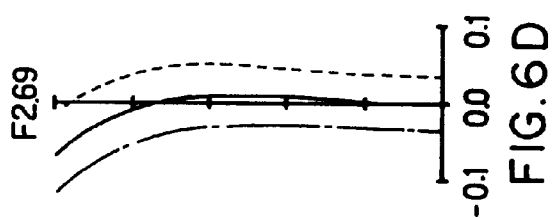
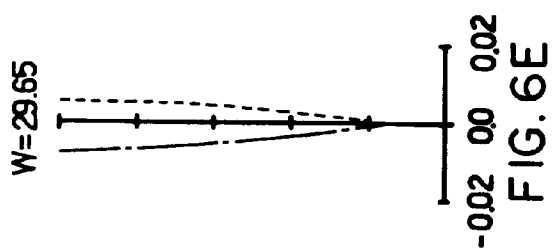

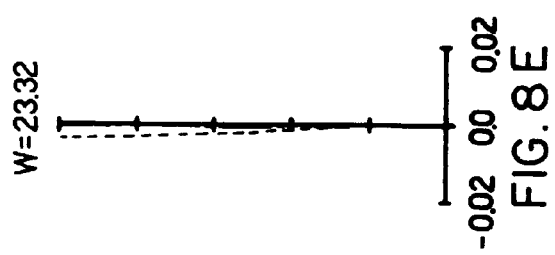
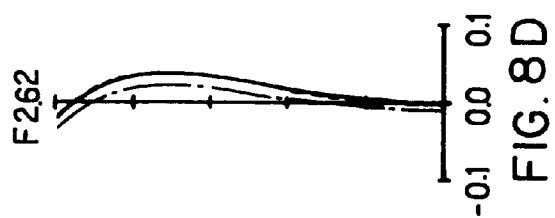
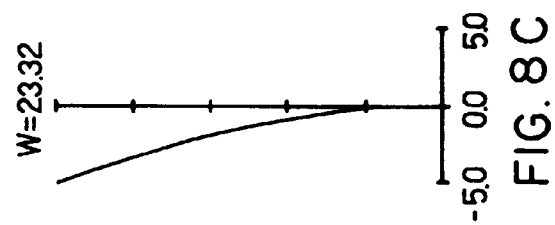
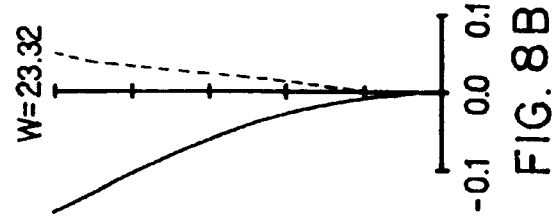
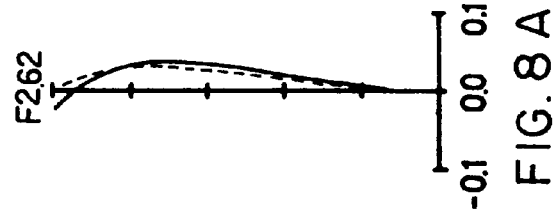

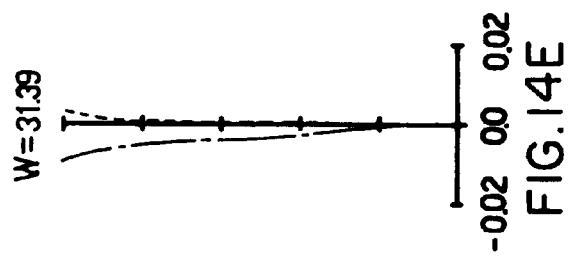
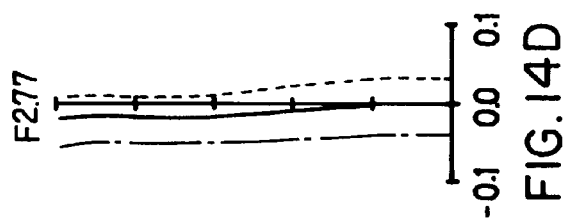
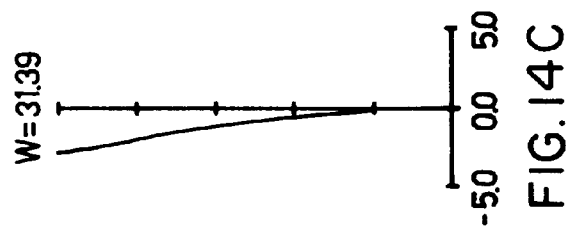
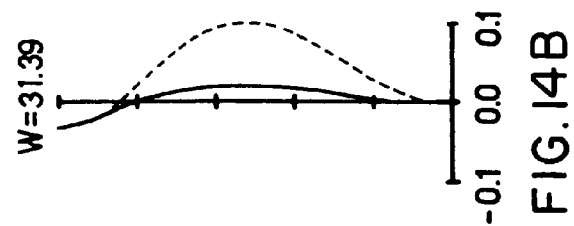
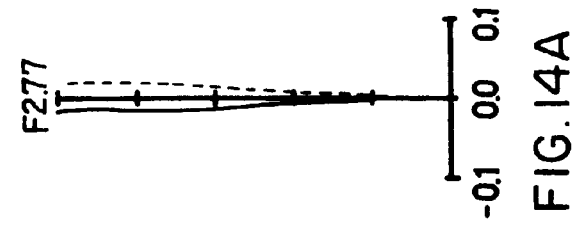

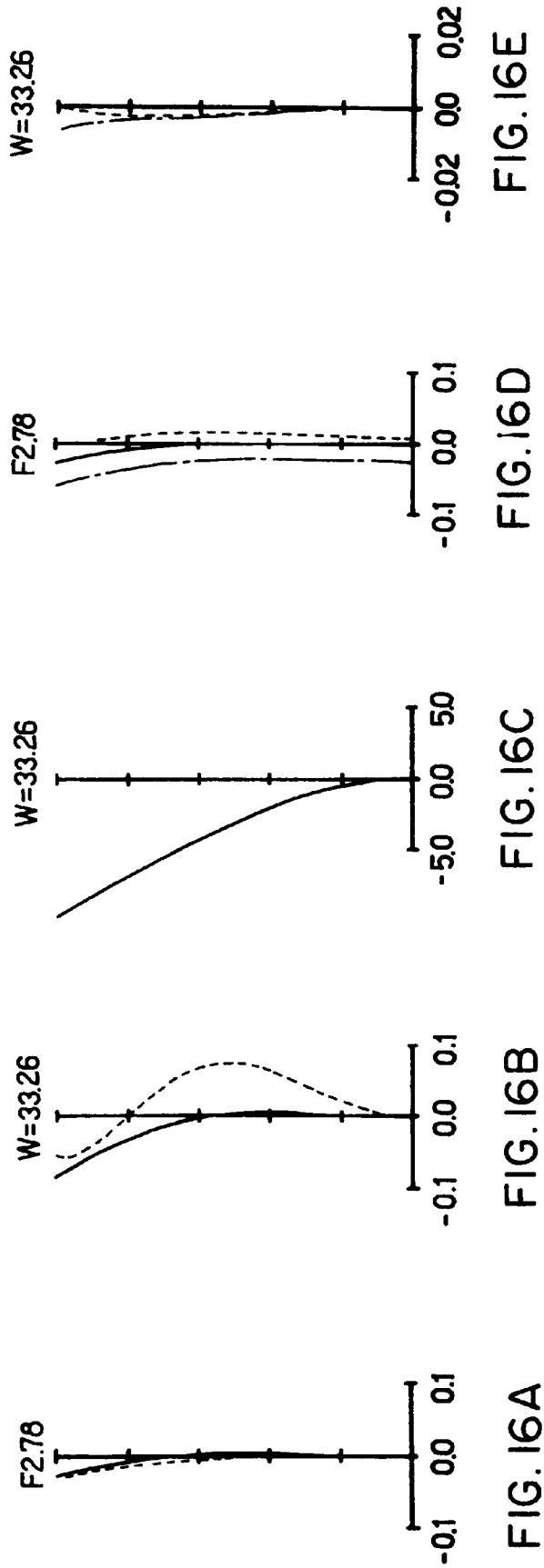

OPTICAL SYSTEM WITH GRATING ELEMENT AND IMAGING DEVICE USING THE SAME

FIELD OF THE INVENTION

The present invention relates to an optical imaging system with corrected chromatic aberration, and to a small imaging device such as an observation camera or a board camera.

BACKGROUND OF THE INVENTION

In optical imaging systems, imaging performance is of great importance. Factors that influence the imaging performance of the optical system include for example, inherent factors such as lens aberration, diffraction, and refractive index, and external factors such as environmental conditions. Especially chromatic aberration due to a differing refractive index of the lens for each wavelength is a factor that can harm the imaging performance.

Conventional techniques try to reduce the chromatic aberration by combining several lenses with differing Abbe number. Alternatively, it is also known in the art to use anomalous dispersion glass as an achromatic glass system.

As another technique for reducing the chromatic aberration, it has been proposed to add an independent diffraction element to the optical imaging system. Publication of Unexamined Patent Application (Tokukai) No. Hei 8-43767 for example discloses a technique to correct the chromatic aberration by combining a plate diffraction element with a refractive lens. Furthermore, Tokukai No. Hei 6-242373 suggests an objective lens for an optical disk employing a diffractive element on the surface of the lens.

However, in the conventional techniques described above, it is difficult to lower the costs from the viewpoint of lens production and assembly, because a certain number of lenses is needed. In other words, those techniques all result in a rising number of parts, because it is necessary to employ an element not directly involved in the convergent effect to correct the chromatic aberration. Moreover, the technique of employing an independent diffraction element on the lens surface cannot be used for an optical imaging system, because the wavelength range of such a technique is narrow and its angle of view is small.

SUMMARY OF THE INVENTION

The purpose of the present invention is to solve the above problems, that is to provide an optical system that can be used in an optical imaging system and displays good imaging performance with corrected chromatic aberration without increasing the number of lenses, by employing a lens surface with a diffractive effect.

In order to fulfill the above purpose, an optical system with a grating element according to a first configuration of the present invention comprises a lens with positive refractive power having a concave incident surface and a grating element surface with positive refractive power formed on at least one surface of the lens. With this configuration, an optical system displaying good imaging performance with corrected chromatic aberration can be obtained without increasing the number of lenses.

It is preferable that the above optical system satisfies the equation $$0.05 < \left|\frac{r_2}{r_1}\right| < 0.5, \quad (\text{EQ. 1})$$

wherein $r_1$ is the radius of curvature at the vertex of the incident surface of the lens, and $r_2$ is the radius of curvature at the vertex of the outgoing surface of the lens. If the above equation is met, an optimal lens shape for balancing of all aberrations can be obtained.

Moreover, it is preferable that at least one surface of the lens is an aspherical surface with a radius of curvature that becomes bigger with increased distance from the optical axis. This configuration has a considerable effect on the correction of distortion. It is preferable that the grating element surface is formed on the aspherical surface. Thus, manufacturing of the lens becomes easy and a grating element surface with excellent transcription performance can be produced.

It is preferable that the above optical system satisfies the equation $$0.05 < \left|\frac{F}{f_g}\right| < 0.15, \quad (\text{EQ. 2})$$

wherein F is the resultant focal distance of the optical system, and $f_g$ is the focal distance of the grating element. If the above equation is met, chromatic aberration can be properly corrected.

An optical system with a grating element according to a second configuration of the present invention, comprises a first lens with negative refractive power having a concave outgoing surface, and a second lens with positive refractive power having a convex outgoing surface, the first lens and the second lens being arranged in that order starting at the object side, and a grating element surface being formed on at least one surface of the second lens. With this configuration, an optical system displaying good imaging performance with corrected chromatic aberration can be obtained without increasing the number of lenses.

It is preferable that the grating element surface has positive refractive power. Moreover, it is preferable that the optical system satisfies the equation $$0.05 < \left|\frac{F}{f_g}\right| < 0.15, \quad (\text{EQ. 3})$$

wherein F is the resultant focal distance of the entire optical system, and $f_g$ is the focal distance of the grating element. If the above equation is met, chromatic aberration can be properly corrected and an optical system with good imaging performance can be obtained.

Moreover, it is preferable that at least one surface of the lenses of the optical system is an aspherical surface with a radius of curvature that becomes bigger with increased distance from the optical axis. This configuration has a considerable effect on the correction of distortion. It is preferable that the grating element surface is formed on the aspherical surface. Thus, manufacturing of the lens becomes easy and a grating element surface with excellent transcription performance can be produced.

It is preferable that the above optical system satisfies the equation $$0.5 < \left|\frac{f_2}{f_1}\right| < 1.0, \quad (EQ.\ 4)$$

wherein $f_1$ is the focal distance of the first lens, and $f_2$ is the focal distance of the second lens. If the above equation is met, chromatic aberration can be properly corrected.

It is preferable that the resultant focal distance of the entire optical system can be varied by altering the air space distance between the first and the second lens. It is also preferable that the above optical system satisfies the equation $$1.3 < \left|\frac{f_1}{f_w}\right| < 2.0, \quad (EQ.\ 5)$$

wherein $f_1$ is the focal distance of the first lens, and $f_w$ is the resultant focal distance of the entire optical system for the shortest focal distance. Thus, the focal distance can be made variable without deterioration due to aberrations.

An optical system with a grating element according to a second configuration of the present invention comprises two lenses with positive refractive power, one lens with negative refractive power, and a grating element surface formed on at least one surface of the lenses. More specifically, a first lens with negative refractive power, a second lens with positive refractive power, and a third lens with negative refractive power are arranged in that order starting at the object side, and a grating element surface is formed on at least one surface of the second lens. With this configuration, an optical system displaying good imaging performance with corrected chromatic aberration can be obtained without increasing the number of lenses.

In this configuration, it is preferable that the outgoing surface of the first lens is concave, and the grating element surface is formed on the outgoing surface of the third lens. It is also preferable that the grating element surface has positive refractive power. It is furthermore preferable that the above optical system satisfies the equation $$0.05 < \left|\frac{F}{f_g}\right| < 0.15, \quad (EQ.\ 6)$$

wherein $F$ is the resultant focal distance of the entire optical system, and $f_g$ is the focal distance of the grating element. If the above equation is met, chromatic aberration can be properly corrected and an optical system with good imaging performance can be obtained.

It is preferable that at least one surface of the lenses of the optical system is an aspherical surface with a radius of curvature that becomes bigger with increased distance from the optical axis. This configuration has a considerable effect on the correction of distortion. It is preferable that the grating element surface is formed on the aspherical surface. Thus, manufacturing of the lens becomes easy and a grating element surface with excellent transcription performance can be produced.

It is preferable that the resultant focal distance of the entire optical system can be varied by altering the air space distance between the first and the second lens. It is furthermore preferable that the above optical system satisfies the equation $$1.3 < \left|\frac{f_1}{f_w}\right| < 2.0, \quad (EQ.\ 7)$$

wherein $f_1$ is the focal distance of the first lens, and $f_w$ is the resultant focal distance of the entire optical system for the shortest focal distance. Thus, the focal distance can be made variable without deterioration due to aberrations.

It is preferable that the grating element surface according to the first, second and third configuration of the present invention has a kinoform shape. Furthermore, it is preferable that the lens having the grating element surface is made of glass or of resin. Thus a lens with a grating element having excellent transcription performance and kinoform shape can be realized.

For the configuration of an imaging device according to the present invention, it is preferable that the imaging device comprises an optical system with a grating element according to the first, second or third configuration of the present invention, an imaging element, and a signal processing circuit. With this configuration, the entire imaging device can be made smaller than conventional imaging devices, and an imaging device with excellent imaging performance can be obtained.

BRIEF DESCRIPTION OF THE DRAWINGS

FIG. 2 shows the aberrations in the optical system with a grating element of FIG. 1.

FIG. 6 shows the aberrations in the optical system with a grating element of FIG. 5.

FIG. 8 shows the aberrations in the optical system with a grating element of FIG. 7.

FIG. 14 shows the aberrations in the optical system with a grating element of FIG. 13.

FIG. 16 shows the aberrations on the short focal distance side in the optical system with a grating element of FIG. 15.

DESCRIPTION OF THE PREFERRED EMBODIMENTS

The following is an explanation of an example of an optical system with a grating element according to the present invention. First of all, a design method for a grating element according to the present invention is explained.

A grating element is an optical element making use of the phenomenon of diffraction. Whereas a refractive element has a high refractive index for short wave lengths, the grating element has a higher diffractive angle for longer wavelengths. Therefore, the behavior concerning chromatic aberration is opposite to that of a refractive element. The dispersion of the grating element is determined by the working wavelength, and generally, in the case of color photographs or images, the wavelength range necessary for picture-taking is in the range of about 430 nm–630 nm. In this range, the dispersion of the grating element becomes negative. When this grating element is combined with a refractive element having a positive refractive power, then the chromatic aberration can be corrected by using a grating element having a positive refractive power.

As a specific design method for the grating element, the high refractive index method proposed by William C. Sweatt was used (see "Describing Holographic Optical Elements as Lenses", Journal of Optical Society of America, Vol. 67, No. 6, June 1977). Sweatt shows that a ray of light in a grating element can be displaced by refraction due to a hypothetical high refractive index, and when the refractive index becomes infinite, the grating element perfectly matches a diffractive element. However, an infinite refractive index cannot be defined for practical design purposes, and one has to settle for some finite value. Below, the discrepancies between the high refractive index method and the actual diffractive grating are explained.

Figure 22:
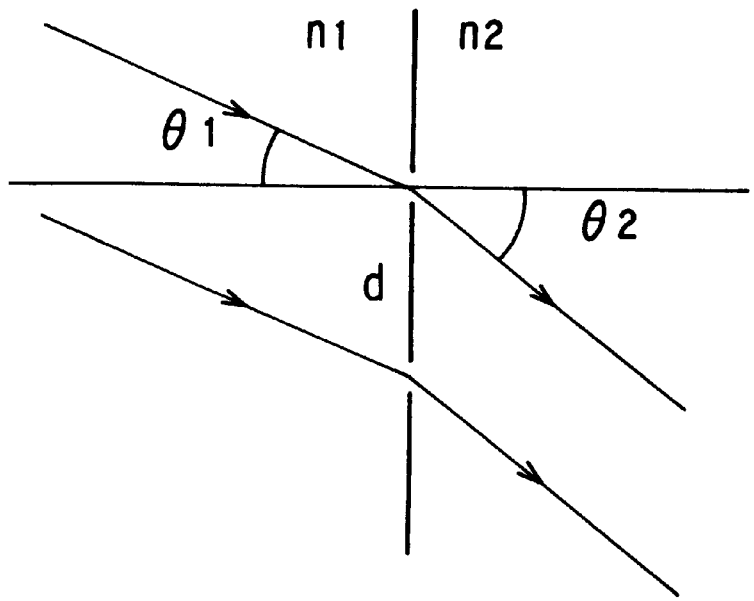
FIG. 22 is a drawing to illustrate an analysis of the discrepancies in the Sweatt model.
Figure 23:
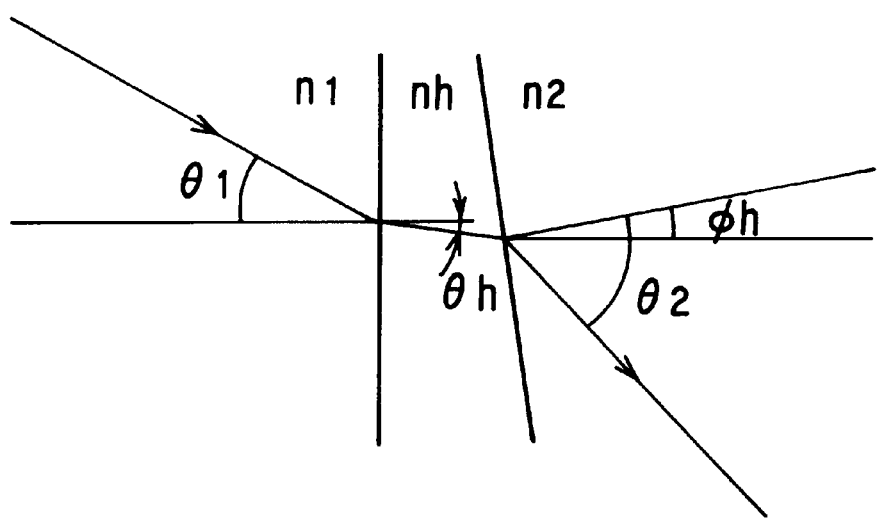
FIG. 23 is also a drawing to illustrate an analysis of the discrepancies in the Sweatt model.

FIGS. 22 and 23 shows an analysis of the discrepancies in the Sweatt model. The diffraction can be found with the following equation:

$$n_1 \sin\theta_1 - n_2 \sin\theta_2 = \frac{\lambda}{d}. \quad \text{(EQ. 8)}$$

On the other hand, because refraction takes places two times, at a first surface and at a second surface, Snell's law applies two times. The first application of Snell's law is shown in EQ. 9, the second by EQ. 10:

$$n_1 \sin \theta_1 = n_n \sin \theta_h, \quad \text{(EQ. 9)}$$

$$n_n \sin(\theta_h + \phi_h) = n_2 \sin \theta_2. \quad \text{(EQ. 10)}$$

If we suppose $\theta_h \ll 1$, then the difference between the two outgoing radiation angles becomes $\lambda/dn_h$. If f is the focal distance of the lens, then the discrepancy $\Delta$ of the rays' position on the image surface is $$\Delta = \frac{\lambda \cdot f}{d \cdot n_h}. \quad \text{(EQ. 11)}$$

For example, if we assume a wave length of 550 nm, a focal distance f=5 mm, a grating pitch of 20 μm, and a high refractive index $n_h$=5501, then the discrepancy of the rays' position on the image surface becomes 0.025 μm. This is less then a tenth of the value of the required design accuracy and should cause no concern. The refractive index in the case of design with the high refraction index method was set at ten times the wavelength plus one. The reason to add one is that, if first-order diffraction is used, the height of the grating is fixed at $\lambda/(n-1)$. That means, if the refractive index n is 10λ+1, then a grating could be etched every 0.1 nm into the high refractive index layer. This is convenient, because the number of zones can be calculated easily, if the sag of the high refractive index layer is calculated. For example, if the sag of the high refractive index layer is 2.5 nm, then the number of zones is 25. However, for the actual number of zones, the refraction direction has also to be considered, so the number of zones cannot be calculated correctly, if only the sag measured vertically to the surface is considered, but it is useful to get an idea.

First Embodiment

Next, a first embodiment for an optical system with a grating element according to the present invention is explained with reference to the drawings. FIG. 1, 3, 5 and 7 show sectional views of the specific Examples 1, 2, 3, and 4 for an optical system with a grating element respectively.

In FIGS. 1, 3, 5 and 7, the optical system with a grating element according to this embodiment includes a first lens 1, a plate 4 that is optically equivalent to a quartz filter or a face plate of an imaging device and an imaging surface 5 arranged in that order starting on the object side (left side in the drawing). The first lens 1 has a concave incident surface, an outgoing surface that has an aspheric surface with a radius of curvature that becomes bigger with the distance from the optical axis, and a grating element surface 40 having a positive refractive power on the outgoing surface.

Figure 21:
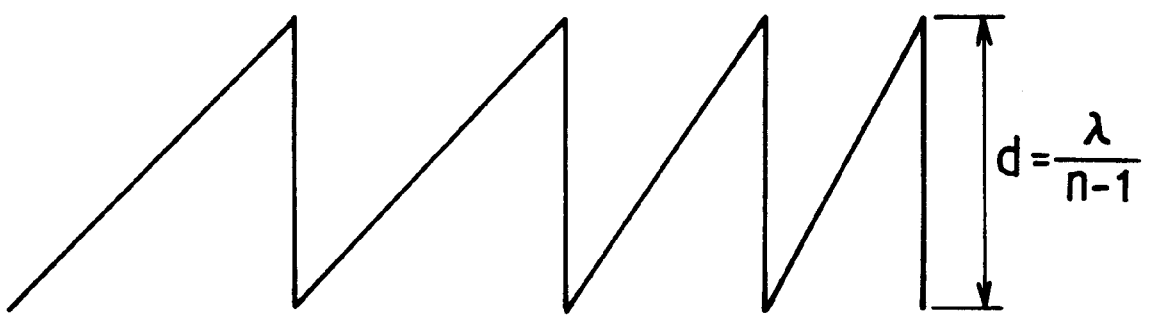
FIG. 21 is a magnified sectional view showing the kinoform shape of a grating element surface.
Figure 24:
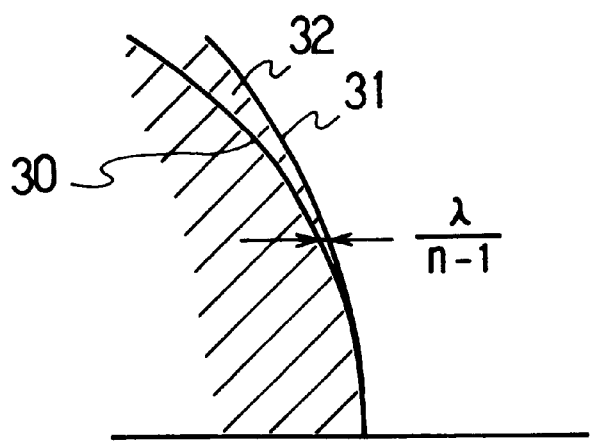
FIG. 24 is a magnified sectional view of the outgoing surface of a lens before it is converted into a grating element surface.
Figure 25:
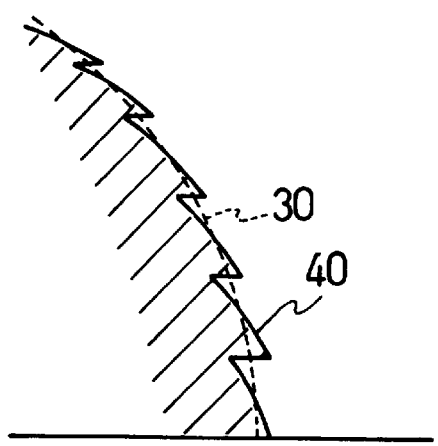
FIG. 25 is a magnified sectional view of the grating element surface formed by converting the lens surface shown in FIG. 24.

The numerical values shown for the outgoing surface of the first lens 1 in the examples are the values before conversion into the grating element surface 40 and the grating element surface 40 is formed according to the numerical values. To be specific, at the time of design the outgoing surface of the first lens 1 has a high refraction surface 31 ($r_2$ in the Examples 1–4) on a base aspheric surface 30 ($r_3$ in the Examples 1–4), as is shown in FIG. 24, and in order to gain the same effect as an outgoing surface consisting of the base aspherical surface 30 and the high refraction index surface 31 (suppose there is a high refractive index portion 32 between the two surfaces), it is replaced by a grating element surface 40 such as the one shown in FIG. 25 by the method described above. Furthermore, the grating element surface 40 has a kinoform shape as is shown in FIG. 21. The first lens 1 comprising the grating element surface 40 is made either from glass or from resin. Thus, a kinoform-shaped lens with a grating element having excellent transcription performance can be realized.

In this first embodiment, the radius of curvature in the vertex of the incident surface of the first lens 1 is $r_1$ and the radius of curvature in the vertex of the outgoing surface of the first lens 1 is $r_2$, so that by satisfying the above-mentioned EQ. 1 a lens can be shaped that is appropriate to balance all the aberrations. When the upper or lower limit is exceeded, then the incident ray angle of non-axial light becomes greater, and this results in a deterioration of the non-axial performance and a drop of the diffraction efficiency, which will lead to flare. Moreover, if the radius of curvature of the outgoing surface becomes small, then production of the lens becomes more difficult, and this may become a factor in decreasing yield and raising costs. In the above configuration, forming an aspherical surface wherein the radius of curvature of at least one surface becomes bigger with the distance from the optical axis has a considerable effect on correcting distortion. And, in the above configuration, the lens preparation becomes easy and a grating element surface with excellent transcription performance can be made by using an aspherical surface as the grating element surface.

In this first embodiment, if the resultant focal distance of the optical system is F and the focal distance of the grating element is $f_g$, then the chromatic aberration can be corrected by satisfying EQ. 2. Exceeding the upper or lower limit results in under-correction or over-correction of the chromatic aberration respectively and thus it becomes difficult to attain a favorable imaging performance.

The Examples 1–4 below are specific numerical examples for the first embodiment. F is the resultant focal distance of the entire system, Fno is the F-number, and $2\omega$ is the ray angle. In this embodiment, $r_1, r_2, \ldots$ etc. are the curvature radii of each lens surface taken in that order starting at the object side, $d_1, d_2, \ldots$ etc. represent the thickness of each lens or the air space interval between two lenses taken in that order starting at the object side, and $n_d$ and $v_d$ are the refractive index and the Abbe number of the lens material. The surface having an aspherical shape (marked with an asterisk ☆ in the column "Surface No." in the embodiments) is ruled by the following equation:

$$Z = \frac{cy^2}{1 + \sqrt{1 - (1+k)c^2 y^2}} + Dy^4 + Ey^6 + Fy^8 + Gy^{10}, \quad \text{(EQ. 12)}$$

with

Z: Distance from the tangent plane at the vertex of the aspherical surface at an elevation y from the optical axis, y: Elevation from the optical axis, c: Curvature at the vertex of the aspherical surface, k: Conical constant, and D, E, F, G: Aspherical coefficients.

Below, specific numerical values are shown for Example 1. Therein, the high refraction surfaces that have been designed with the high refraction index method are marked with a circle (○) in the column "Surface No."

EXAMPLE 1

| Surface No. | F = 5.7 | Fno = 2.7 | $2\omega$ = 44.8 | |
|---|---|---|---|---|
| | r | d | $n_d$ | $v_d$ |
| 1☆ | −9.84000 | 2.5 | 1.588066 | 62.35 |
| 2☆○ | −2.84150 | 0.0 | 5877 | −3.45 |
| 3☆ | −2.84149 | 3.6 | | |
| 4 | ∞ | 1.8 | 1.516330 | 64.10 |
| 5 | ∞ | | | |

The surfaces marked by ☆ are aspherical surfaces and their aspheric coefficients are given below:

| | Surface No. 1 | Surface No. 2 | Surface No. 3 |
|---|---|---|---|
| k | 0.0 | 0.0 | 0.0 |
| D | −1.49016 × 10$^{-2}$ | −1.15144 × 10$^{-4}$ | −1.15108 × 10$^{-4}$ |
| E | −2.09289 × 10$^{-3}$ | −2.56909 × 10$^{-4}$ | −2.56899 × 10$^{-4}$ |
| F | 0.0 | 0.0 | 0.0 |
| G | 0.0 | 0.0 | 0.0 |

FIG. 2 shows the aberrations in an optical system with a grating element according to the above Example 1. In FIGS. 2, (a), (b), (c), (d) and (e) denote spherical aberration (mm), astigmatism (mm), distortion (%), axial chromatic aberration (mm), and magnification chromatic aberration respectively. In FIG. 2 (a), which shows the spherical aberration, the solid line is the D-line and the broken line shows the sine condition. In FIG. 2 (b), which shows astigmatism, the solid line shows the sagittal image surface curve and the broken line shows the meridional image surface curve. In FIG. 2 (d), which shows the axial chromatic aberration, the solid line is the D-line, the broken line is the F-line and the dash-dotted line is a C-line. In FIG. 2 (e), which shows the magnification chromatic aberration, the broken line is the F-line and the dash-dotted line is the C-line. As is clear from these diagrams, according to Example 1, the chromatic aberration is corrected and an optical system with a grating element that displays good imaging performance can be attained.

Next, specific numerical values are shown for Example 2.

EXAMPLE 2

| | F = 6.7 | Fno = 2.7 | 2ω = 38.2 | |
|---|---|---|---|---|
| Surface No. | r | d | $n_d$ | $v_d$ |
| 1☆ | −8.90000 | 2.7 | 1.525380 | 56.66 |
| 2☆○ | −3.00000 | 0.0 | 5877 | −3.45 |
| 3☆ | −2.99998 | 4.8 | | |
| 4 | ∞ | 1.8 | 1.516330 | 64.10 |
| 5 | ∞ | | | |

The surfaces marked by ☆ are aspherical surfaces and their aspheric coefficients are given below:

| | Surface No. 1 | Surface No. 2 | Surface No. 3 |
|---|---|---|---|
| k | 0.0 | 0.0 | 0.0 |
| D | $-1.01884 \times 10^{-2}$ | $6.61273 \times 10^{-4}$ | $-6.61230 \times 10^{-4}$ |
| E | $-2.30851 \times 10^{-3}$ | $-1.83991 \times 10^{-4}$ | $-1.83991 \times 10^{-4}$ |
| F | 0.0 | 0.0 | 0.0 |
| G | 0.0 | 0.0 | 0.0 |

FIG. 4 shows the aberrations in an optical system with a grating element according to the above Example 2. In FIGS. 4, (a), (b), (c), (d) and (e) denote spherical aberration (mm), astigmatism (mm), distortion (%), axial chromatic aberration (mm), and magnification chromatic aberration respectively. In FIG. 4 (a), which shows the spherical aberration, the solid line is the D-line and the broken line shows the sine condition. In FIG. 4 (b), which shows astigmatism, the solid line shows the sagittal image surface curve and the broken line shows the meridional image surface curve. In FIG. 4 (d), which shows the axial chromatic aberration, the solid line is the D-line, the broken line is the F-line and the dash-dotted line is the C-line. In FIG. 4 (e), which shows the magnification chromatic aberration, the broken line is the F-line and the dash-dotted line is the C-line. As is clear from these diagrams, according to Example 2, the chromatic aberration is corrected and an optical system with a grating element that displays good imaging performance can be attained.

Next, specific numerical values are shown for Example 3.

EXAMPLE 3

| | F = 4.3 | Fno = 2.7 | 2ω = 59.3 | |
|---|---|---|---|---|
| Surface No. | r | d | $n_d$ | $v_d$ |
| 1☆ | −15.00000 | 2.4 | 1.525380 | 56.66 |
| 2☆○ | −2.28025 | 0.0 | 5877 | −3.45 |
| 3☆ | −2.28023 | 1.9 | | |
| 4 | ∞ | 1.8 | 1.516330 | 64.10 |
| 5 | ∞ | | | |

The surfaces marked by ☆ are aspherical surfaces and their aspheric coefficients are given below:

| | Surface No. 1 | Surface No. 2 | Surface No. 3 |
|---|---|---|---|
| k | 0.0 | 0.0 | 0.0 |
| D | $-3.06689 \times 10^{-2}$ | $1.70550 \times 10^{-3}$ | $1.70546 \times 10^{-3}$ |
| E | $1.11758 \times 10^{-3}$ | $6.65885 \times 10^{-4}$ | $6.65915 \times 10^{-4}$ |
| F | 0.0 | 0.0 | 0.0 |
| G | 0.0 | 0.0 | 0.0 |

FIG. 6 shows the aberrations in an optical system with a grating element according to the above Example 3. In FIGS. 6, (a), (b), (c), (d) and (e) denote spherical aberration (mm), astigmatism (mm), distortion (%), axial chromatic aberration (mm), and magnification chromatic aberration respectively. In FIG. 6 (a), which shows the spherical aberration, the solid line is the D-line and the broken line shows the sine condition. In FIG. 6 (b), which shows astigmatism, the solid line shows the sagittal image surface curve and the broken line shows the meridional image surface curve. In FIG. 6 (d), which shows the axial chromatic aberration, the solid line is the D-line, the broken line is the F-line and the dash-dotted line is the C-line. In FIG. 6 (e), which shows the magnification chromatic aberration, the broken line is the F-line and the dash-dotted line is the C-line. As is clear from these diagrams, according to Example 3, the chromatic aberration is corrected and an optical system with a grating element that displays good imaging performance can be attained.

Next, specific numerical values are shown for Example 4.

EXAMPLE 4

| | F = 5.5 | Fno = 2.6 | 2ω = 46.6 | |
|---|---|---|---|---|
| Surface No. | r | d | $n_d$ | $v_d$ |
| 1☆ | −15.00000 | 2.6 | 1.525380 | 56.66 |
| 2☆○ | −2.70000 | 0.0 | 5877 | −3.45 |
| 3☆ | −2.69998 | 3.2 | | |
| 4 | ∞ | 1.8 | 1.516330 | 64.10 |
| 5 | ∞ | | | |

The surfaces marked by ☆ are aspherical surfaces and their aspheric coefficients are given below:

| | Surface No. 1 | Surface No. 2 | Surface No. 3 |
|---|---|---|---|
| k | 0.0 | 0.0 | 0.0 |
| D | $-1.7.3983 \times 10^{-2}$ | $8.04881 \times 10^{-4}$ | $8.04857 \times 10^{-4}$ |
| E | $-7.96659 \times 10^{-4}$ | $-1.66260 \times 10^{-4}$ | $-1.66227 \times 10^{-4}$ |
| F | 0.0 | 0.0 | 0.0 |
| G | 0.0 | 0.0 | 0.0 |

FIG. 8 shows the aberrations in an optical system with a grating element according to the above Example 4. In FIGS. 8, (a), (b), (c), (d) and (e) denote spherical aberration (mm), astigmatism (mm), distortion (%), axial chromatic aberration (mm), and magnification chromatic aberration respectively. In FIG. 8 (a), which shows the spherical aberration, the solid line is the D-line and the broken line shows the sine condition. In FIG. 8 (b), which shows astigmatism, the solid line shows the sagittal image surface curve and the broken line shows the meridional image surface curve. In FIG. 8 (d), which shows the axial chromatic aberration, the solid line is the D-line, the broken line is the F-line and the dash-dotted line is the C-line. In FIG. 8 (e), which shows the magnification chromatic aberration, the broken line is the F-line and the dash-dotted line is the C-line. As is clear from these diagrams, according to Example 4, the chromatic aberration is corrected and an optical system with a grating element that displays good imaging performance can be attained.

The present embodiment was described as having a grating element surface on the outgoing surface of the first lens. However, the present invention is not limited to this configuration, and a configuration having a grating element surface on the incident surface also is possible. Furthermore, in the present embodiment, the outgoing surface was described as having a spherical shape with a radius of curvature that becomes bigger with increased distance from the optical axis. However the present invention is not limited to this configuration, and an incident surface having a spherical shape with a radius of curvature that becomes bigger with increased distance from the optical axis would also be possible.

Second Embodiment

Next, a second embodiment of the optical system with a grating element according to the present invention is explained with reference to the drawings. FIGS. 9, 11, 13, and 15 show sectional views of specific Examples 5, 6, 7, and 8 respectively of an optical system with a grating element according to the second embodiment.

Figure 1:
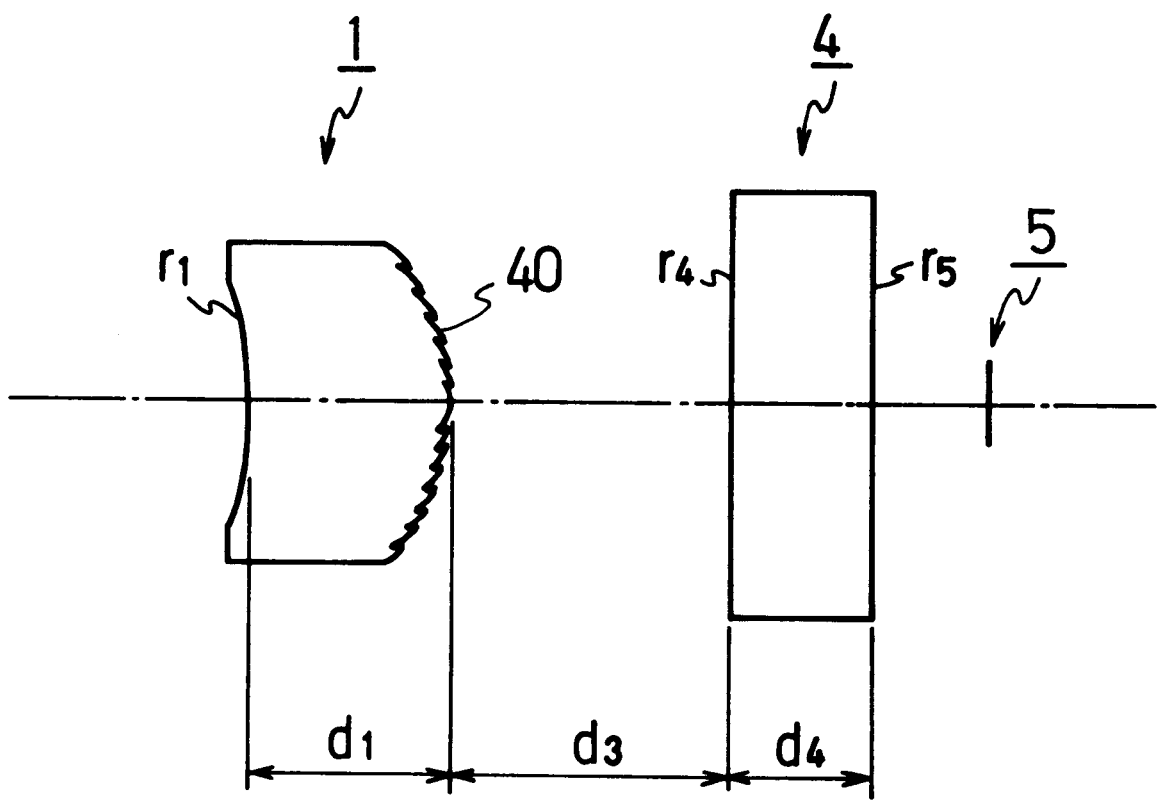
FIG. 1 is a sectional view showing the lens configuration of Example 1 of an optical system with a grating element according to the first embodiment of the present invention.
Figure 3:
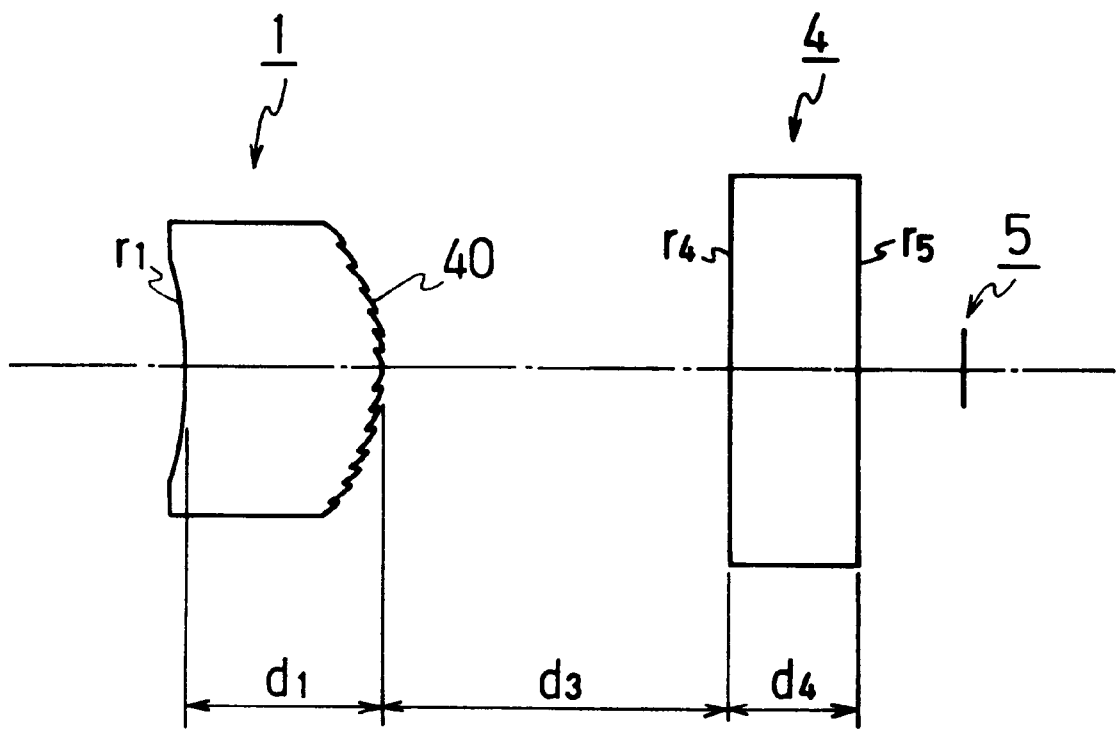
FIG. 3 is a sectional view showing the lens configuration of Example 2 of an optical system with a grating element according to the first embodiment of the present invention.
Figure 4A:
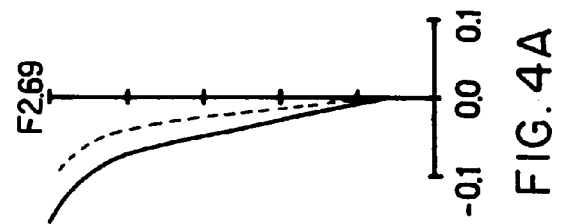
FIG. 4 shows the aberrations in the optical system with a grating element of FIG. 3.
Figure 4B:
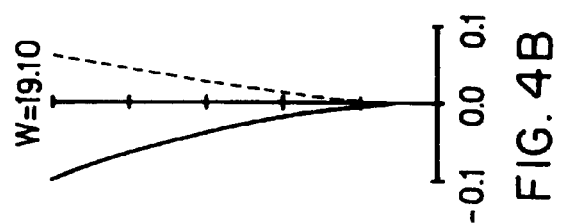
Figure 4C:
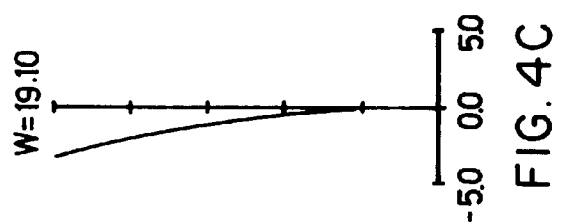
Figure 4D:
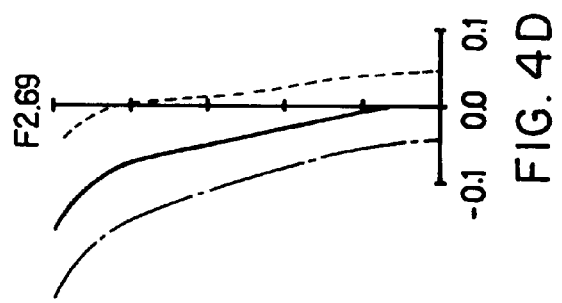
Figure 4E:
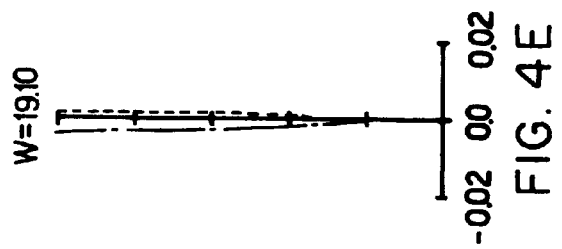
Figure 5:
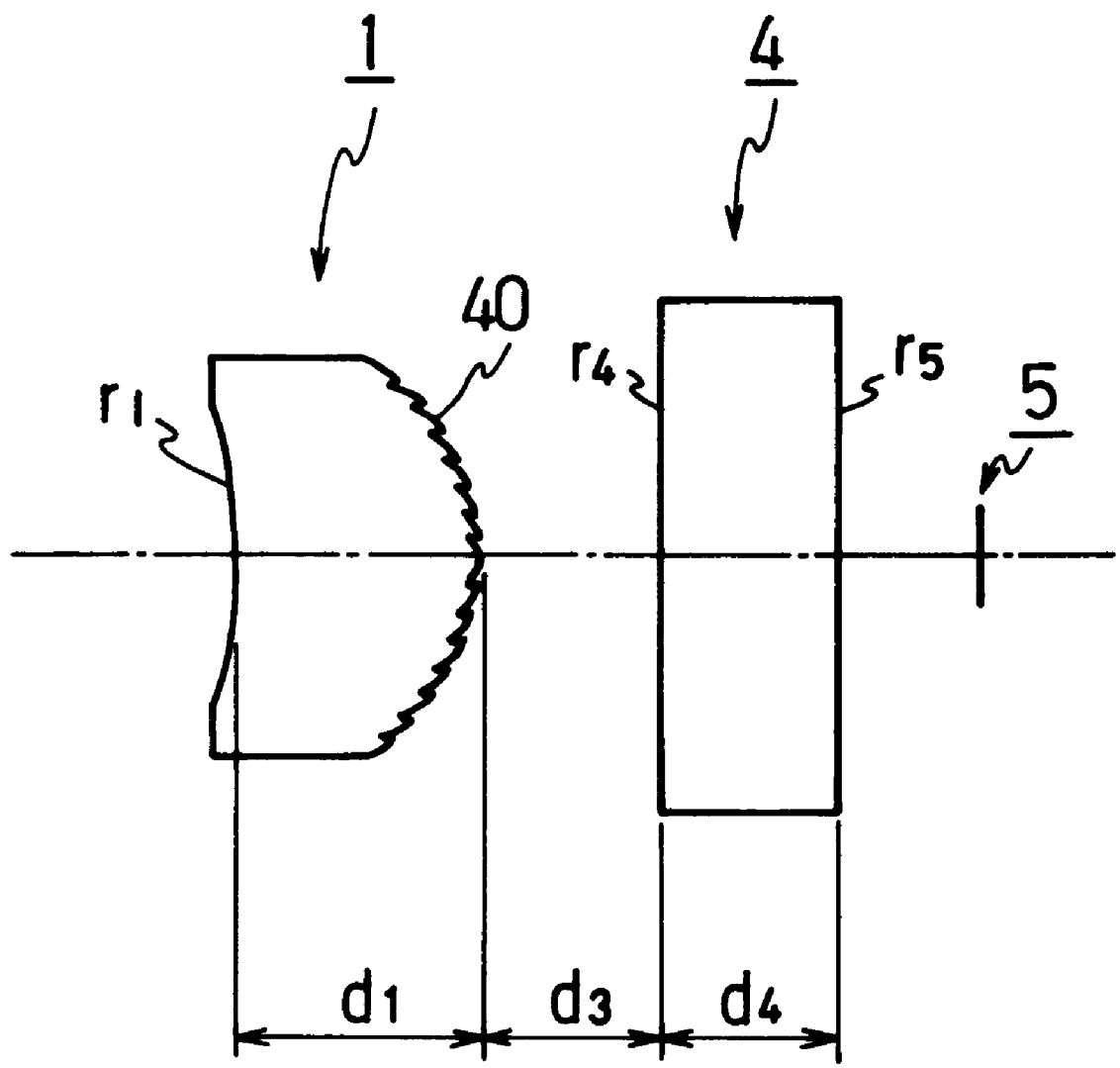
FIG. 5 is a sectional view showing the lens configuration of Example 3 of an optical system with a grating element according to the first embodiment of the present invention.
Figure 7:
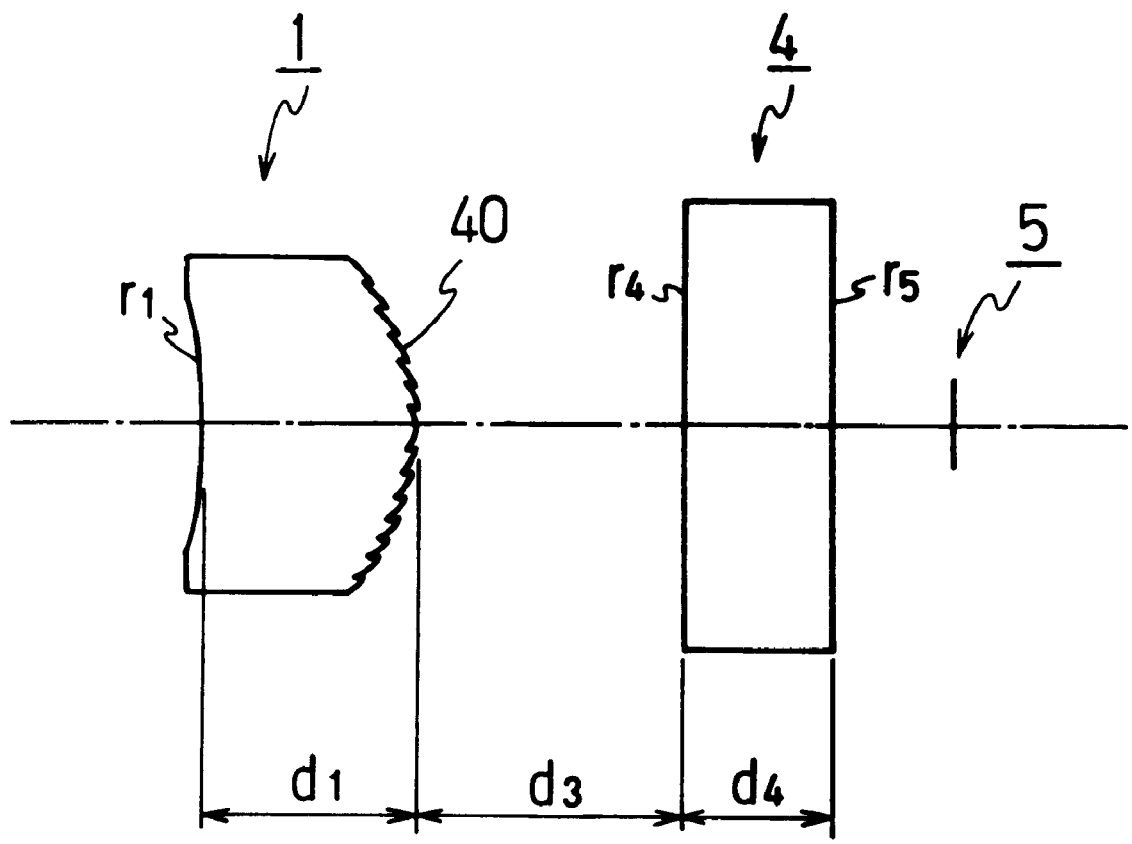
FIG. 7 is a sectional view showing the lens configuration of Example 4 of an optical system with a grating element according to the first embodiment of the present invention.
Figure 9:
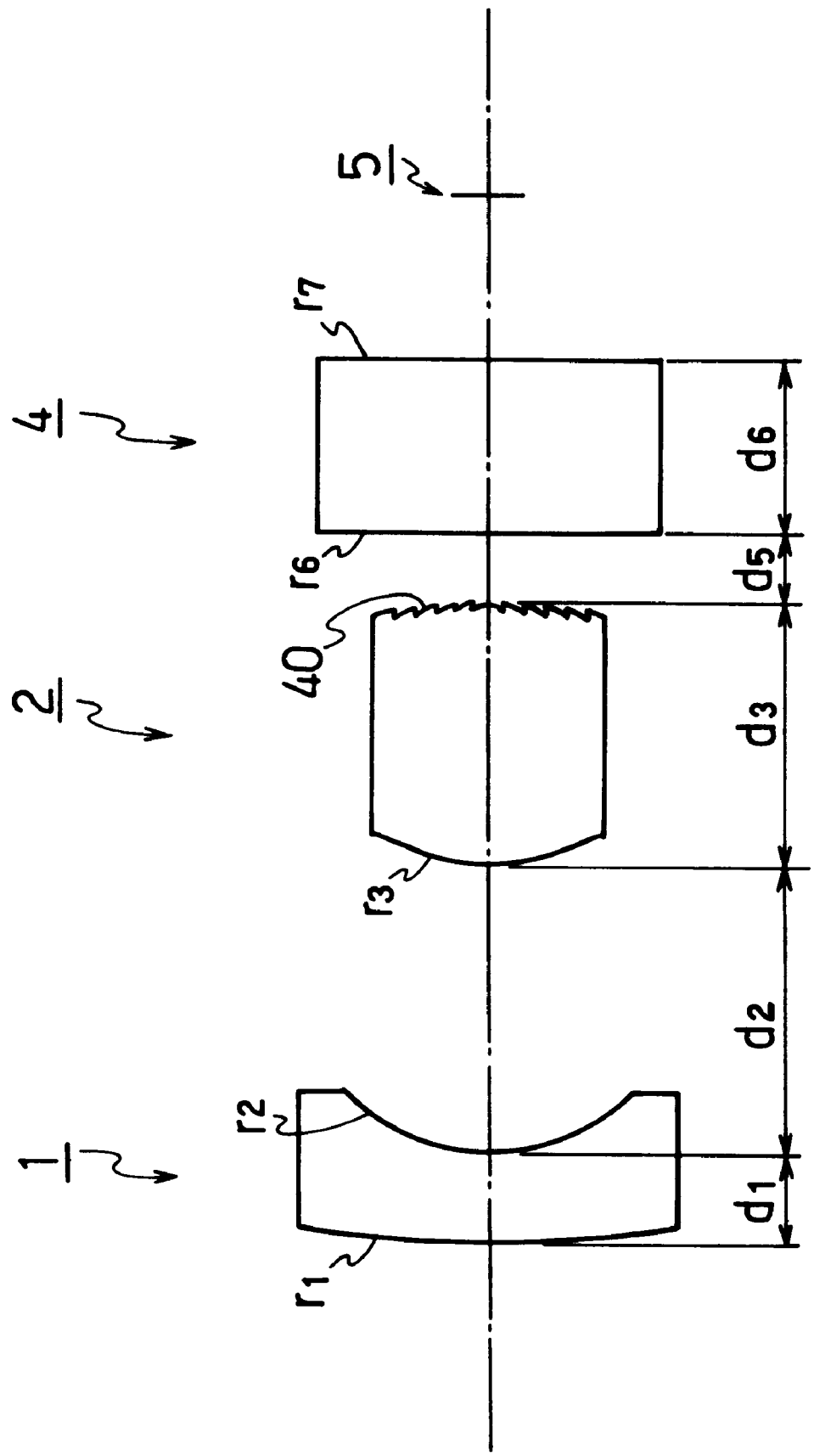
FIG. 9 is a sectional view showing the lens configuration of Example 5 of an optical system with a grating element according to the second embodiment of the present invention.
Figure 10E:
FIG. 10 shows the aberrations in the optical system with a grating element of FIG. 9.
Figure 10D:
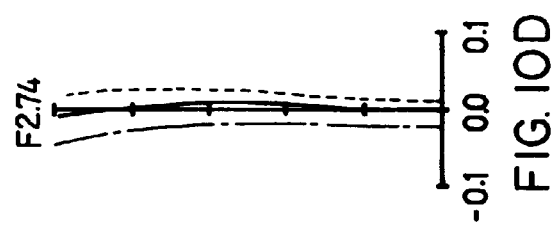
Figure 10C:
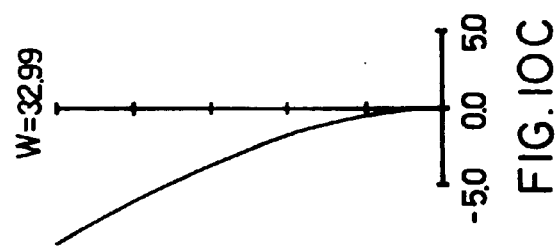
Figure 10B:
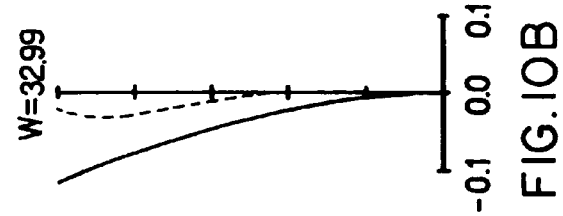
Figure 10A:
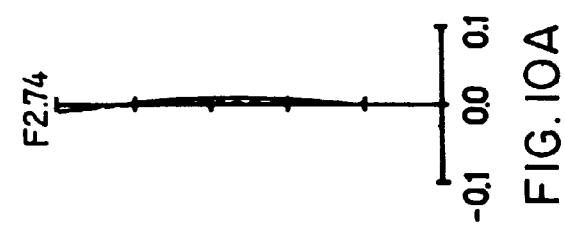
Figure 11:
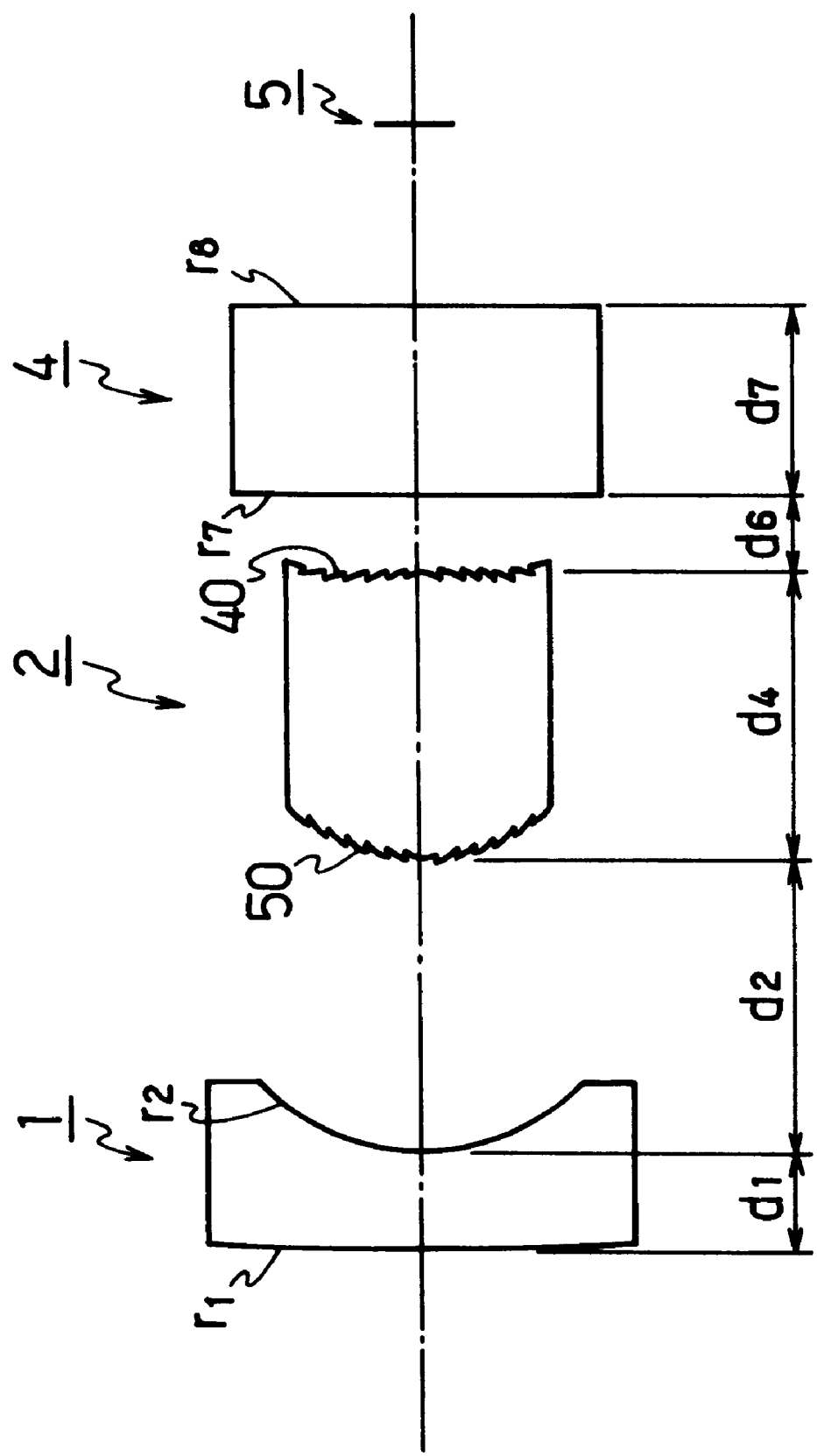
FIG. 11 is a sectional view showing the lens configuration of Example 6 of an optical system with a grating element according to the second embodiment of the present invention.
Figure 12E:
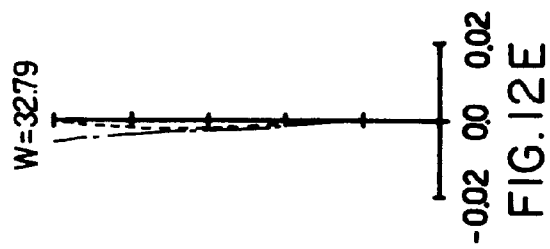
FIG. 12 shows the aberrations in the optical system with a grating element of FIG. 11.
Figure 12D:
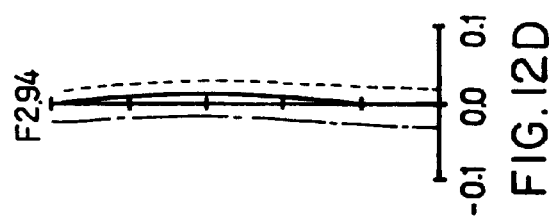
Figure 12C:
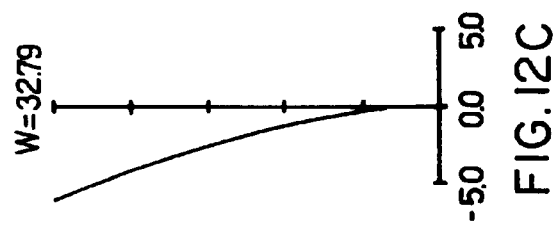
Figure 12B:
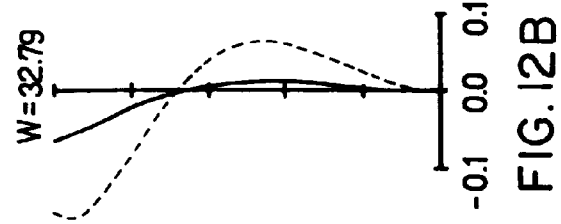
Figure 12A:
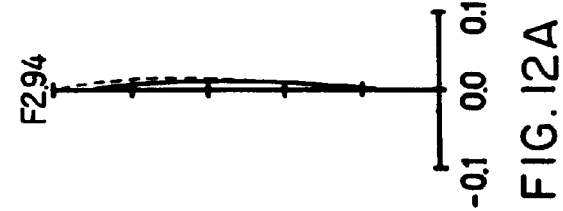
Figure 13:
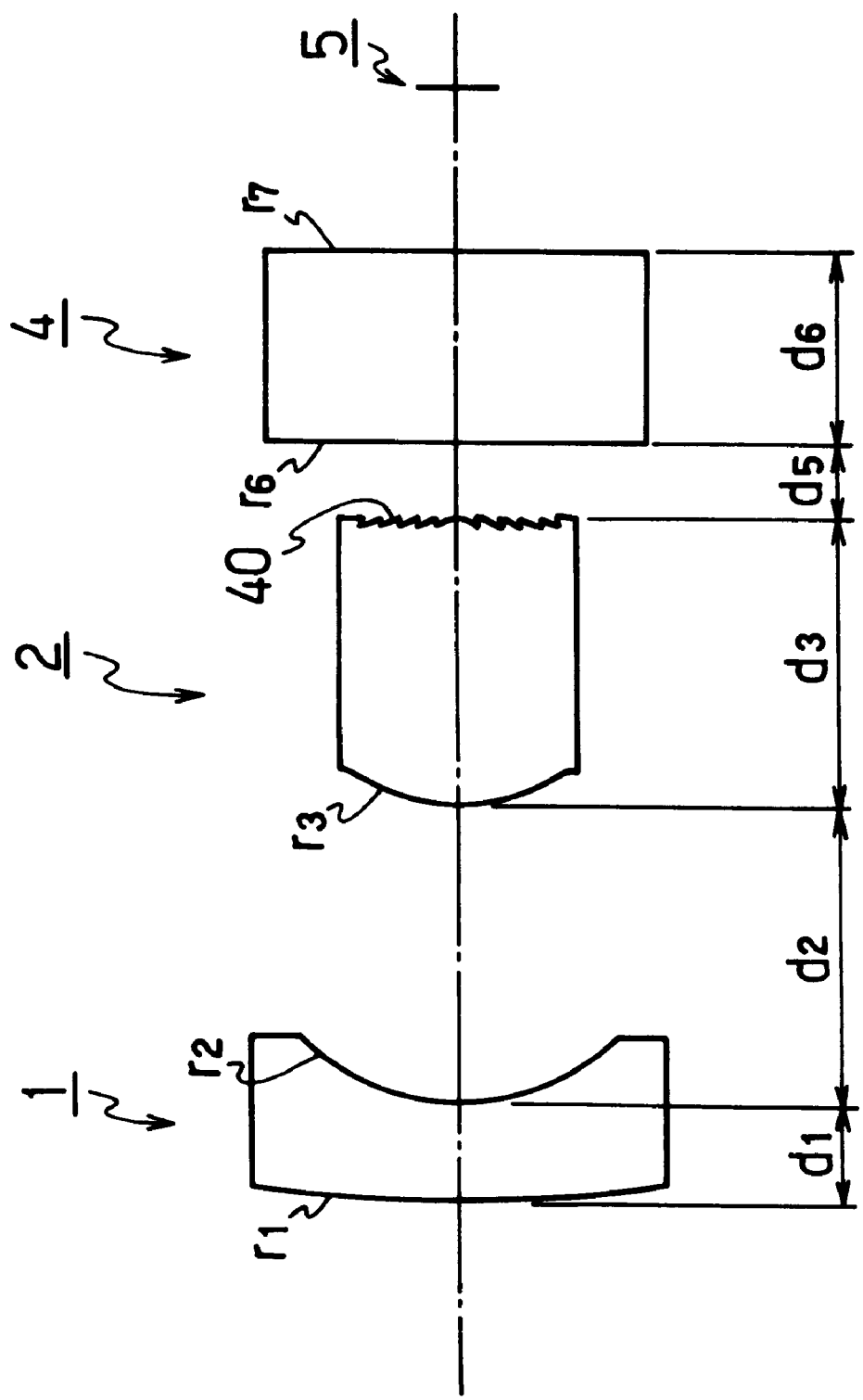
FIG. 13 is a sectional view showing the lens configuration of Example 7 of an optical system with a grating element according to the second embodiment of the present invention.
Figure 15:
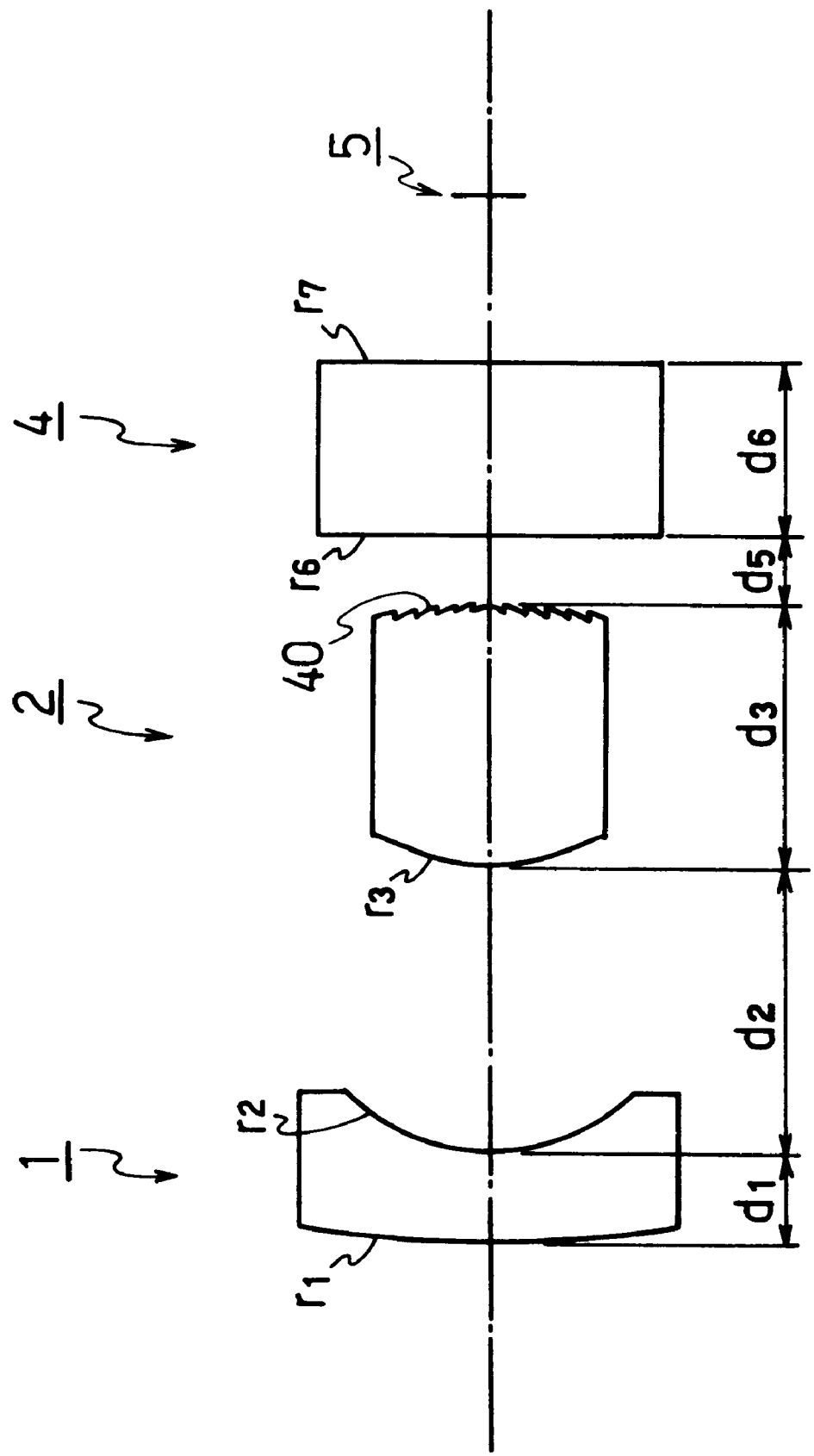
FIG. 15 is a sectional view showing the lens configuration of Example 8 of an optical system with a grating element according to the second embodiment of the present invention.
Figure 17A:
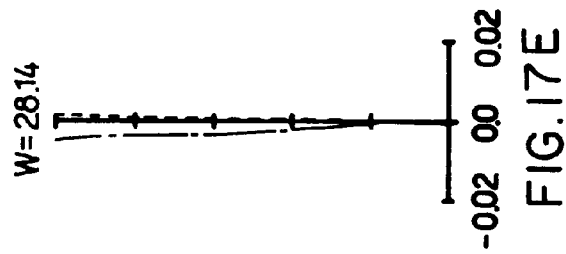
FIG. 17 shows the aberrations on the long focal distance side in the optical system with a grating element of FIG. 15.
Figure 17B:
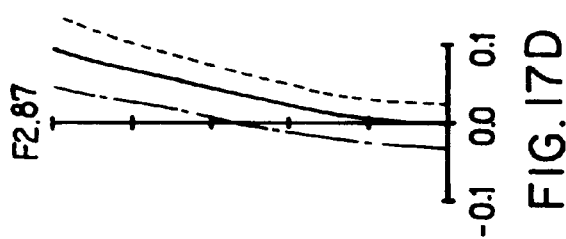
Figure 17C:
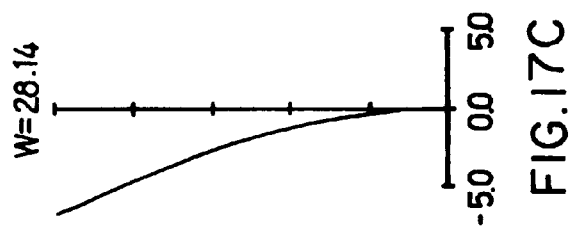
Figure 17D:
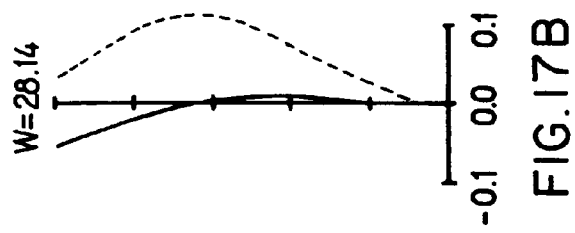
Figure 17E:
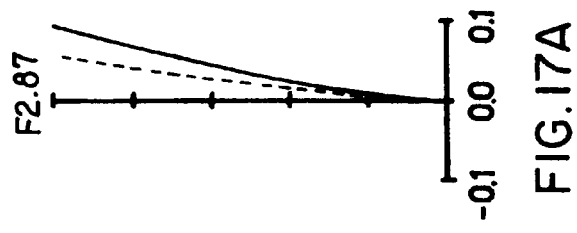

In FIGS. 9, 11, 13, and 15, in the optical system with a grating element according to this embodiment, a first lens 1, a second lens 2, a plate 4 that is optically equivalent to a quartz filter or a face plate of an imaging device, and an imaging surface 5 are arranged in that order starting on the object side (left side in the drawing). This optical system with a grating element uses two lenses, the first lens 1 having a concave outgoing surface and a negative refractive power, and the second lens 2 having a convex incident surface and a positive refractive power and a grating element surface 40 with a positive refractive power on the outgoing surface. In addition, Example 6, which is shown in FIG. 11, comprises a grating element 50 on the incident surface of the second lens 2 as well.

Figure 26:
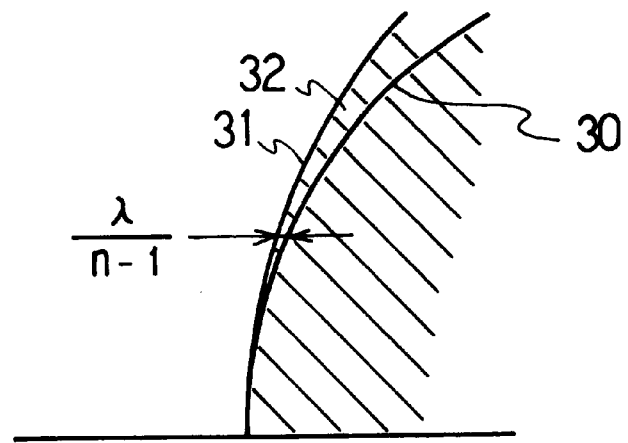
FIG. 26 is a magnified sectional view of the outgoing surface of a lens before it is converted into a grating element surface.
Figure 27:
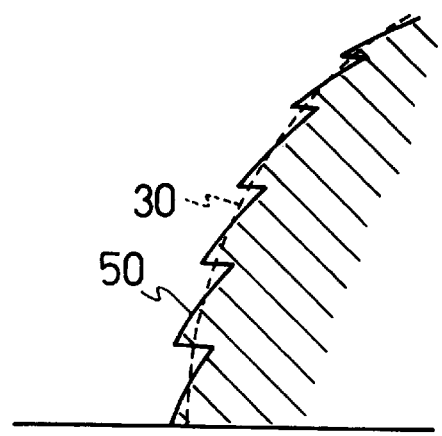
FIG. 27 is a magnified sectional view of the grating element surface formed by converting the lens surface shown in FIG. 26.

The numerical values shown for the outgoing surface of the second lens 2 in the examples are the values before conversion into the grating element surface 40 and the grating element surface 40 is formed according to the numerical values. To be specific, at the time of design the outgoing surface of the second lens 2 has a high refraction surface 31 ($r_4$ in the Examples 5, 7 and 8 and $r_5$ in the Example 6) on a base aspheric surface 30 ($r_5$ in the Examples 5, 7 and 8 and $r_6$ in the Example 6), as is shown in FIG. 24, and in order to gain the same effect as an outgoing surface consisting of the base aspherical surface 30 and the high refraction index surface 31 (suppose there is a high refractive index portion 32 between the two surfaces), it is replaced by a grating element surface 40 such as the one shown in FIG. 25 by the method described above. In addition, at the time of design, the incident surface of the second lens 2 in Example 6 (see FIG. 11) has a high refraction surface 31 ($r_3$ in Example 6) on a base aspheric surface 30 ($r_4$ in Example 6), as is shown in FIG. 26, and in order to gain the same effect as an outgoing surface consisting of the base aspherical surface 30 and the high refraction index surface 31 (suppose there is a high refractive index portion 32 between the two surfaces), it is replaced by a grating element surface 50 such as the one shown in FIG. 27 by the method described above.

The grating element surfaces 40 and 50 have a kinoform shape, as is shown in FIG. 21 and the second lens 2 comprising the grating element surfaces 40 and 50 is made either from glass or from resin. Thus, a kinoform-shaped lens with a grating element having excellent transcription performance can be realized.

In the second embodiment, the resultant focal distance of the optical system with a grating element is denoted by F and the focal distance of the grating element is denoted by $f_g$. By satisfying EQ. 3, achromatic aberration is corrected and an optical system with good imaging performance can be attained. Exceeding the upper or lower limit results in under-correction or over-correction of the chromatic aberration respectively and thus it becomes difficult to attain a favorable imaging performance. Moreover, in the configuration described above, at least one surface is aspherical and has a radius of curvature that becomes greater with increased distance from the optical axis, which has a considerable effect on the correction of the distortion. Furthermore, by making one aspherical surface into a grating element surface, the lens can be easily manufactured and a grating element surface with excellent transcription performance can be produced.

Moreover, in this second embodiment, the focal distance of the first lens 1 is denoted by $f_1$ and the focal distance of the second lens is denoted by $f_2$. By satisfying EQ. 4, a balanced correction of all aberrations can be attained. When the upper limit is exceeded, the balanced correction of all aberrations becomes difficult, and when the lower limit is exceeded, the distance between the first lens 1 and the second lens 2 becomes big, so that the goal of miniaturization cannot be met.

Furthermore, in the configuration described above, the resultant focal distance of the entire system can be made variable by changing the air space interval between the first lens 1 and the second lens 2. When the resultant focal distance of the entire system is made variable by changing the air space interval between the first lens 1 and the second lens 2, then the focal distance can be made variable without deterioration due to aberrations by satisfying EQ. 5, wherein on the short focal distance side $f_2$ denotes the resultant focal distance of the entire system and $f_1$ denotes the focal distance of the first lens. If the upper limit is exceeded, then the translation distance of the air space interval becomes large when the focal distance is changed, which is an obstacle to miniaturization, and if the lower limit is exceeded, then it becomes difficult to perform a balanced correction of all aberrations.

The Examples 5–8 below are specific numerical examples for the second embodiment. F is the resultant focal distance of the entire system, Fno is the F-number, and 2ω is the ray angle. In this embodiment, $r_1$, $r_2$, . . . etc. are the curvature radii of each lens surface taken in that order starting at the object side, $d_1$, $d_2$, . . . etc. represent the thickness of each lens or the air space interval between two lenses taken in that order starting at the object side, and $n_d$ and $v_d$ are the refractive index and Abbe number of the lens material. The surfaces having an aspherical shape (marked with an asterisk ☆ in the column "Surface No." in the embodiments) are ruled by EQ. 12. The high refraction surfaces that have been designed with the high refraction index method are marked with a circle (○) in the column "Surface No.".

Next, specific numerical values are shown for Example 5.

EXAMPLE 5

| | F = 3.8  Fno = 2.7  2ω = 60.0 | | | |
|---|---|---|---|---|
| Surface No. | r | d | $n_d$ | $v_d$ |
| 1☆ | 15.00000 | 1.2 | 1.525380 | 56.66 |
| 2 | 2.76200 | 3.9 | | |
| 3☆ | 2.96000 | 3.5 | 1.525380 | 56.66 |
| 4☆○ | −5.96600 | 0.0 | 5877 | −3.45 |
| 5☆ | −5.96588 | 1.0 | | |
| 6 | ∞ | 1.8 | 1.516330 | 64.10 |
| 7 | ∞ | | | |

The surfaces marked by ☆ are aspherical surfaces and their aspheric coefficients are given below:

| | Surface No. 1 | Surface No. 3 | Surface No. 4 | Surface No. 5 |
|---|---|---|---|---|
| k | 0.0 | −3.20434 | 0.0 | 0.0 |
| D | $-2.81919 \times 10^{-4}$ | $1.29008 \times 10^{-2}$ | $1.27487 \times 10^{-2}$ | $1.27485 \times 10^{-2}$ |
| E | $7.89784 \times 10^{-5}$ | $-1.86932 \times 10^{-4}$ | $8.73101 \times 10^{-4}$ | $8.73112 \times 10^{-4}$ |
| F | $-6.96177 \times 10^{-6}$ | 0.0 | $2.92707 \times 10^{-4}$ | $2.92707 \times 10^{-4}$ |
| G | 0.0 | 0.0 | 0.0 | 0.0 |

FIG. 10 shows the aberrations in an optical system with a grating element according to the above Example 5. In FIGS. 10, (a), (b), (c), (d) and (e) denote spherical aberration (mm), astigmatism (mm), distortion (%), axial chromatic aberration (mm), and magnification chromatic aberration respectively. In FIG. 10 (a), which shows the spherical aberration, the solid line is the D-line and the broken line shows the sine condition. In FIG. 10 (b), which shows astigmatism, the solid line shows the sagittal image surface curve and the broken line shows the meridional image surface curve. In FIG. 10 (d), which shows the axial chromatic aberration, the solid line is the D-line, the broken line is the F-line and the dash-dotted line is the C-line. In FIG. 10 (e), which shows the magnification chromatic aberration, the broken line is the F-line and the dash-dotted line is the C-line. As is clear from these diagrams, according to Example 5, the chromatic aberration is corrected and an optical system with a grating element that displays good imaging performance can be attained.

Next, specific numerical values are shown for Example 6.

EXAMPLE 6

| | F = 3.7  Fno = 2.9  2ω = 65.6 | | | |
|---|---|---|---|---|
| Surface No. | r | d | $n_{d/}$ | $v_d$ |
| 1☆ | ∞ | 1.2 | 1.525380 | 56.66 |
| 2 | 2.76200 | 3.7 | | |
| 3☆○ | 2.45570 | 0.0 | 5877 | −3.45 |
| 4☆ | 2.45570 | 3.5 | 1.525380 | 56.66 |
| 5☆○ | −10.73817 | 0.0 | 5877 | −3.45 |
| 6☆ | −10.73770 | 1.0 | | |
| 7 | ∞ | 1.8 | 1.516330 | 64.10 |
| 8 | ∞ | | | |

The surfaces marked by ☆ are aspherical surfaces and their aspheric coefficients are given below:

| | Surface No. 1 | Surface No. 3 | Surface No. 4 | Surface No. 5 | Surface No. 6 |
|---|---|---|---|---|---|
| k | 0.0 | −0.72351 | −0.72351 | 0.0 | 0.0 |
| D | $9.34875 \times 10^{-4}$ | $2.87860 \times 10^{-3}$ | $2.87854 \times 10^{-3}$ | $1.98678 \times 10^{-2}$ | $1.98680 \times 10^{-2}$ |
| E | $2.21302 \times 10^{-4}$ | $7.61582 \times 10^{-4}$ | $7.61648 \times 10^{-4}$ | $9.63900 \times 10^{-4}$ | $9.63528 \times 10^{-4}$ |
| F | $-3.10510 \times 10^{-5}$ | 0.0 | 0.0 | $2.10456 \times 10^{-3}$ | $2.10456 \times 10^{-3}$ |
| G | 0.0 | 0.0 | 0.0 | 0.0 | 0.0 |

FIG. 12 shows the aberrations in an optical system with a grating element according to the above Example 6. In FIGS. 12, (a), (b), (c), (d) and (e) denote spherical aberration (mm), astigmatism (mm), distortion (%), axial chromatic aberration (mm), and magnification chromatic aberration respectively. In FIG. 12 (a), which shows the spherical aberration, the solid line is the D-line and the broken line shows the sine condition. In FIG. 12 (b), which shows astigmatism, the solid line shows the sagittal image surface curve and the broken line shows the meridional image surface curve. In FIG. 12 (d), which shows the axial chromatic aberration, the solid line is the D-line, the broken line is the F-line and the dash-dotted line is the C-line. In FIG. 10 (e), which shows the magnification chromatic aberration, the broken line is the F-line and the dash-dotted line is the C-line. As is clear from these diagrams, according to Example 6, the chromatic aberration is corrected and an optical system with a grating element that displays good imaging performance can be attained.

Next, specific numerical values are shown for Example 7.

EXAMPLE 7

| | F = 3.8 Fno = 2.8 2ω = 62.8 | | | |
|---|---|---|---|---|
| Surface No. | r | d | $n_d$ | $v_d$ |
| 1☆ | 25.00000 | 1.2 | 1.525380 | 56.66 |
| 2 | 2.76200 | 3.7 | | |
| 3☆ | 24.49966 | 3.5 | 1.525380 | 56.66 |
| 4☆○ | −10.73826 | 0.0 | 5877 | −3.45 |
| 5☆ | −10.73770 | 1.0 | | |
| 6 | ∞ | 1.8 | 1.516330 | 64.10 |
| 7 | ∞ | | | |

The surfaces marked by ☆ are aspherical surfaces and their aspheric coefficients are given below:

| | Surface No. 1 | Surface No. 3 | Surface No. 4 | Surface No. 5 |
|---|---|---|---|---|
| k | 0.0 | 0.52478 | 0.0 | $1.98680 \times 10^{-2}$ |
| D | $1.14602 \times 10^{-3}$ | $-4.23767 \times 10^{-3}$ | $1.98676 \times 10^{-2}$ | $1.98680 \times 10^{-2}$ |
| E | $5.02799 \times 10^{-5}$ | $-2.51710 \times 10^{-3}$ | $9.63930 \times 10^{-4}$ | $9.63528 \times 10^{-4}$ |
| F | $-9.66224 \times 10^{-6}$ | 0.0 | 2.10456 | $2.10456 \times 10^{-3}$ |
| G | 0.0 | 0.0 | 0.0 | 0.0 |

FIG. 14 shows the aberrations in an optical system with a grating element according to the above Example 7. In FIG. 14, (a), (b), (c), (d) and (e) denote spherical aberration (mm), astigmatism (mm), distortion (%), axial chromatic aberration (mm), and magnification chromatic aberration respectively. In FIG. 14 (a), which shows the spherical aberration, the solid line is the D-line and the broken line shows the sine condition. In FIG. 14 (b), which shows astigmatism, the solid line shows the sagittal image surface curve and the broken line shows the meridional image surface curve. In FIG. 14 (d), which shows the axial chromatic aberration, the solid line is the D-line, the broken line is the F-line and the dash-dotted line is the C-line. In FIG. 14 (e), which shows the magnification chromatic aberration, the broken line is the F-line and the dash-dotted line is the C-line. As is clear from these diagrams, according to Example 7, the chromatic aberration is corrected and an optical system with a grating element that displays good imaging performance can be attained.

Next, specific numerical values are shown for Example 8.

EXAMPLE 8

| | F = .8–4.5 Fno = 2.8–2.9 2ω = 66.6–53.3 | | | |
|---|---|---|---|---|
| Surface No. | r | d | $n_d$ | $v_d$ |
| 1☆ | 15.00000 | 1.2 | 1.588066 | 62.35 |
| 2 | 2.76200 | variable | | |
| 3☆ | 2.96000 | 3.5 | 1.525380 | 56.66 |
| 4☆○ | −5.96600 | 0.0 | 5877 | −3.45 |
| 5☆ | −5.96588 | 1.0 | | |
| 6 | ∞ | 1.8 | 1.516330 | 64.10 |
| 7 | ∞ | | | |

The surfaces marked by ☆ are aspherical surfaces and their aspheric coefficients are given below:

| | Surface No. 1 | Surface No. 3 | Surface No. 4 | Surface No. 5 |
|---|---|---|---|---|
| k | 0.0 | −2.70774 | 0.0 | 0.0 |
| D | $-1.63938 \times 10^{-3}$ | $1.14893 \times 10^{-2}$ | $1.27487 \times 10^{-2}$ | $1.27486 \times 10^{-2}$ |
| E | $4.30575 \times 10^{-4}$ | $-7.02693 \times 10^{-5}$ | $8.73101 \times 10^{-4}$ | $8.73036 \times 10^{-4}$ |
| F | $-4.02597 \times 10^{-5}$ | 0.0 | $2.92707 \times 10^{-4}$ | $2.92723 \times 10^{-4}$ |
| G | 0.0 | 0.0 | 0.0 | 0.0 |

The variable values for F and $d_2$ are shown below:

| F | $d_2$ |
|---|---|
| 3.8 | 3.90 |
| 4.5 | 2.77 |

FIGS. 16 and 17 show the aberrations in an optical system with a grating element according to the above Example 8 for the widest angle position (short focal distance side) and the narrowest angle position (long focal distance side). In FIGS. 16 and 17, (a), (b), (c), (d) and (e) denote spherical aberration (mm), astigmatism (mm), distortion (%), axial chromatic aberration (mm), and magnification chromatic aberration respectively. In FIGS. 16 (a) and 17 (a), which show the spherical aberration, the solid line is the D-line and the broken line shows the sine condition. In FIGS. 16 (b) and 17 (b), which show astigmatism, the solid line shows the sagittal image surface curve and the broken line shows the meridional image surface curve. In FIGS. 16 (d) and 17 (d), which show the axial chromatic aberration, the solid line is the D-line, the broken line is the F-line and the dash-dotted line is the C-line. In FIGS. 16 (e) and 17 (e), which show the magnification chromatic aberration, the broken line is the F-line and the dash-dotted line is the C-line. As is clear from these diagrams, according to Example 8, the chromatic aberration is corrected and an optical system with a grating element that displays good imaging performance over the entire range of variable focal positions can be attained.

The Examples 5, 7 and 8 of the present embodiment were described as having a grating element surface on the outgoing surface of the second lens. However, the present invention is not limited to this configuration, and a configuration having a grating element surface on the incident surface is also possible.

Third Embodiment

Figure 18:
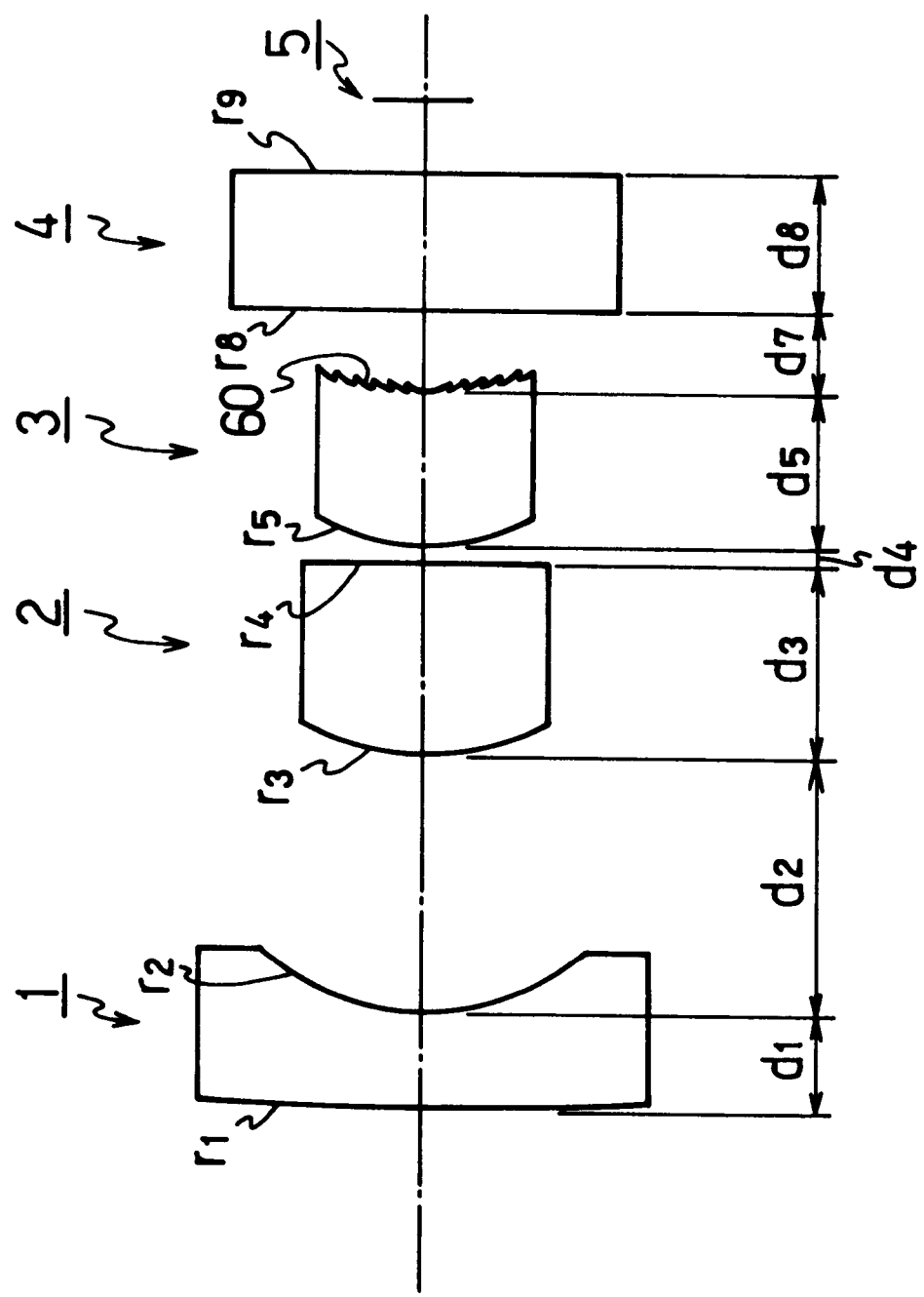
FIG. 18 is a sectional view showing the lens configuration of Example 9 of an optical system with a grating element according to the third embodiment of the present invention.

Next, a third embodiment of the optical system with a grating element according to the present invention is explained with reference to the drawings. FIG. 18 shows a sectional view of the specific Examples 9 of an optical system with a grating element according to the second embodiment in the widest angle position (short focal distance).

In FIG. 18 showing an optical system with a grating element according to this embodiment, a first lens 1, a second lens 2, a third lens 3, a plate 4 that is optically equivalent to a quartz filter or a face plate of the imaging device, and an imaging surface 5 are arranged in that order starting on the object side (left side in the drawing). This optical system with a grating element uses three lenses, the first lens 1 having a negative refractive power, the second lens 2 having a positive refractive power and the third lens 3 also having a positive refractive power. This optical system uses a grating element surface 60 on the outgoing surface of the third lens 3. In addition, the outgoing surface of the first lens 1 and the outgoing surface of the third lens 3 are concave, and the outgoing surface of the third lens 3 has a grating element surface 60 with a positive refractive power.

Figure 28:
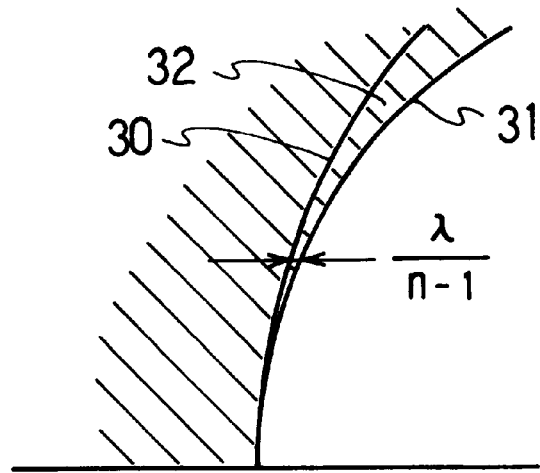
FIG. 28 is a magnified sectional view of the outgoing surface of a lens before it is converted into a grating element surface.
Figure 29:
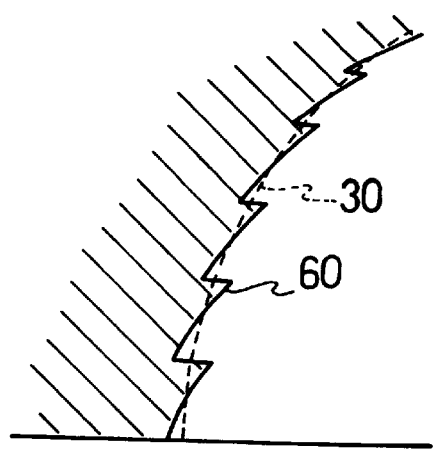
FIG. 29 is a magnified sectional view of the grating element surface formed by converting the lens surface shown in FIG. 28.

The numerical values shown for the outgoing surface of the third lens 3 in Example 9 are the values before conversion into the grating element surface 60 and the grating element surface 60 is formed according to the numerical values. To be specific, at the time of design the outgoing surface of the third lens 3 has a high refraction surface 31 ($r_6$ in Example 9) on a base aspheric surface 30 ($r_7$ in Example 9), as is shown in FIG. 28, and in order to gain the same effect as an outgoing surface consisting of the base aspherical surface 30 and the high refraction index surface 31, it is replaced by a grating element surface 60 such as the one shown in FIG. 29 by the method described above. Furthermore, the grating element surface 60 has a kinoform shape as is shown in FIG. 21. The third lens 3 comprising the grating element surface 60 is made either from glass or from resin. Thus, a kinoform-shaped lens with a grating element having excellent transcription performance can be realized.

In this third embodiment, the resultant focal distance of the optical system with a grating element is denoted by F and the focal distance of the grating element is denoted by $f_g$. By satisfying EQ. 6, achromatic aberration is corrected and an optical system with good imaging performance can be attained. Exceeding the upper or lower limit results in under-correction or over-correction of the chromatic aberration respectively and thus it becomes difficult to attain a favorable imaging performance. Moreover, in the configuration described above, at least one surface is aspherical and has a radius of curvature that becomes greater with increased distance from the optical axis, which has a considerable effect on the correction of the distortion. Furthermore, by making one aspherical surface into a grating element surface, the lens can be easily manufactured and a grating element surface with excellent transcription performance can be produced.

Furthermore, in the configuration described above, the resultant focal distance of the entire system can be made variable by changing the air space interval between the first lens 1 and the second lens 2. When the resultant focal distance of the entire system is made variable by changing the air space interval between the first lens 1 and the second lens 2, then the focal distance can be made variable without deterioration due to aberrations by satisfying EQ. 7, wherein on the short focal distance side $f_w$ denotes the resultant focal distance of the entire system and $f_1$ denotes the focal distance of the first lens. If the upper limit is exceeded, then the translation distance of the air space interval becomes large when the focal distance is changed, which is an obstacle to miniaturization, and if the lower limit is exceeded, then it becomes difficult to perform a balanced correction of all aberrations.

Example 9 below is a specific numerical example for the third embodiment. F is the resultant focal distance of the entire system, Fno is the F-number, and 2ω is the ray angle. In this embodiment, $r_1, r_2, \ldots$ etc. are the curvature radii of each lens surface taken in order starting at the object side, $d_1, d_2, \ldots$ etc. represent the thickness of each lens or the air space distance between two lenses taken in that order starting at the object side, and $n_d$ and $v_d$ are the refractive index and Abbe number of the lens material. The surfaces having an aspherical shape (marked with an asterisk ☆ in the column "Surface No." in the embodiments) are ruled by EQ. 12. The high refraction surfaces that have been designed with the high refraction index method are marked with a circle (○) in the column "Surface No.".

Next, specific numerical values are shown for Example 9.

EXAMPLE 9

| F = 3.8–4.6 | Fno = 2.7–3.0 | 2ω = 63.7–52.8 | | |
|---|---|---|---|---|
| Surface No. | r | d | $n_d$ | $v_d$ |
| 1☆ | 81.48100 | 1.2 | 1.525380 | 56.66 |
| 2 | 3.11900 | variable | | |
| 3☆ | 3.24000 | 2.5 | 1.588066 | 62.35 |
| 4 | ∞ | 0.2 | | |
| 5☆ | 3.06900 | 2.0 | 1.525380 | 56.66 |
| 6☆○ | 6.66184 | 0.0 | 5877 | −3.45 |
| 7☆ | 6.66200 | 1.0 | | |
| 8 | ∞ | 1.8 | 1.516330 | 64.10 |
| 9 | ∞ | | | |

The surfaces marked by ☆ are aspherical surfaces and their aspheric coefficients are given below:

| | Surface No. 1 | Surface No. 3 | Surface No. 5 | Surface No. 6 | Surface No. 7 |
|---|---|---|---|---|---|
| k | −3.2928 | −5.4161 | 0.0 | 0.0 | 0.0 |
| D | $-7.0801 \times 10^{-4}$ | $4.77434 \times 10^{-7}$ | $8.77945 \times 10^{-3}$ | $3.09447 \times 10^{-2}$ | $3.09447 \times 10^{-2}$ |
| E | $1.34173 \times 10^{-5}$ | $-1.87194 \times 10^{-5}$ | $-2.77629 \times 10^{-3}$ | $-5.86120 \times 10^{-3}$ | $-5.86120 \times 10^{-3}$ |
| F | $-5.30903 \times 10^{-7}$ | $-1.32139 \times 10^{-5}$ | $-1.68397 \times 10^{-5}$ | $1.78057 \times 10^{-2}$ | $1.78051 \times 10^{-2}$ |
| G | 0.0 | $4.35301 \times 10^{-6}$ | 0.0 | $-7.55845 \times 10^{-3}$ | $-7.55824 \times 10^{-3}$ |

The variable values for F and $d_2$ are shown below:

| F | $d_2$ |
|---|---|
| 3.8 | 3.3 |
| 4.6 | 2.2 |

Figure 19:
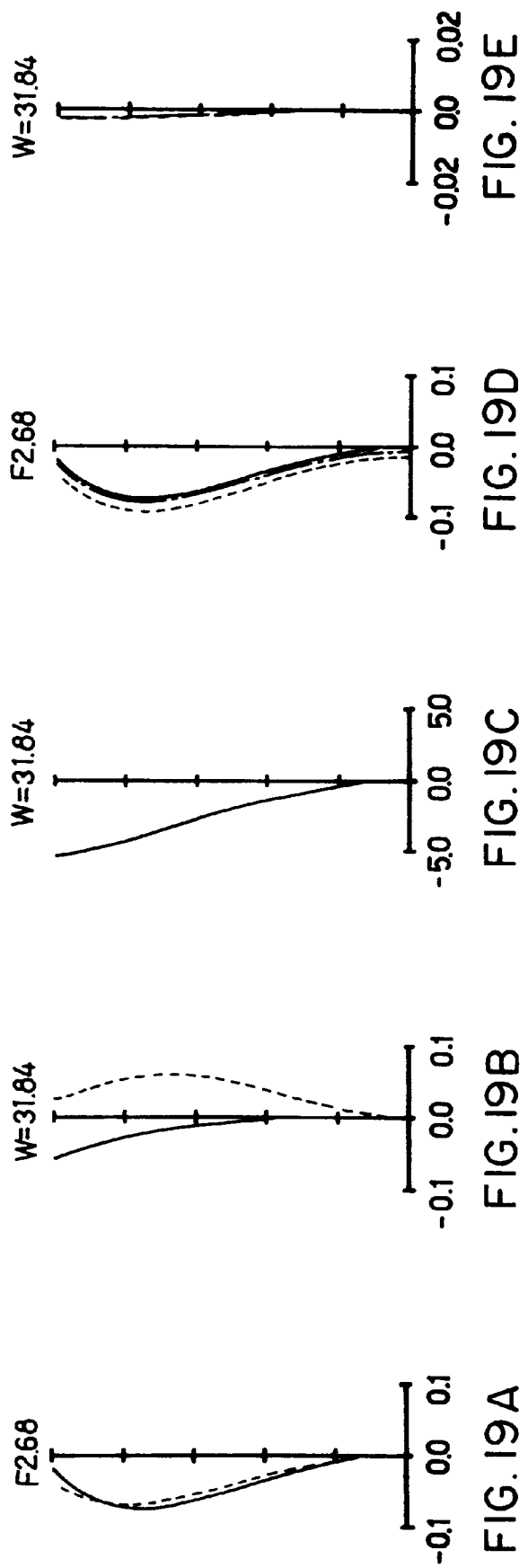
FIG. 19 shows the aberrations on the short focal distance side in the optical system with a grating element of FIG. 18.
Figure 20:
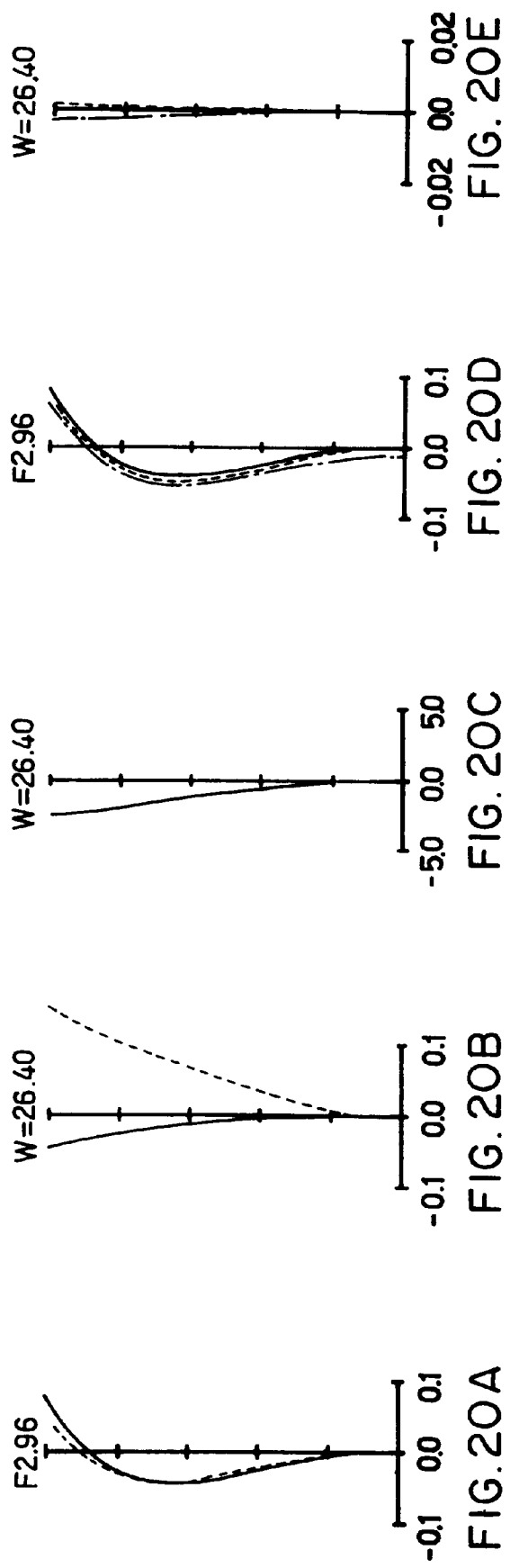
FIG. 20 shows the aberrations on the long focal distance side in the optical system with a grating element of FIG. 18.

FIGS. 19 and 20 show the aberrations in an optical system with a grating element according to the above Example 9 for the widest angle position (short focal distance side) and the narrowest angle position (long focal distance side). In FIGS. 19 and 20, (a), (b), (c), (d) and (e) denote spherical aberration (mm), astigmatism (mm), distortion (%), axial chromatic aberration (mm), and magnification chromatic aberration respectively. In FIGS. 19 (a) and 20 (a), which show the spherical aberration, the solid line is the D-line and the broken line shows the sine condition. In FIGS. 19 (b) and 20 (b), which show astigmatism, the solid line shows the sagittal image surface curve and the broken line shows the meridional image surface curve. In FIGS. 19 (d) and 20 (d), which show the axial chromatic aberration, the solid line is the D-line, the broken line is the F-line and the dash-dotted line is the C-line. In FIGS. 19 (e) and 20 (e), which show the magnification chromatic aberration, the broken line is the F-line and the dash-dotted line is the C-line. As is clear from these diagrams, according to Example 9, the chromatic aberration is corrected and an optical system with a grating element that displays good imaging performance over the entire range of variable focal positions can be attained.

The present embodiment was described as having a grating element surface on the outgoing surface of the third lens. However, the present invention is not limited to this configuration, and a configuration having a grating element surface on the incident surface is also possible.

Fourth Embodiment

Figure 30:
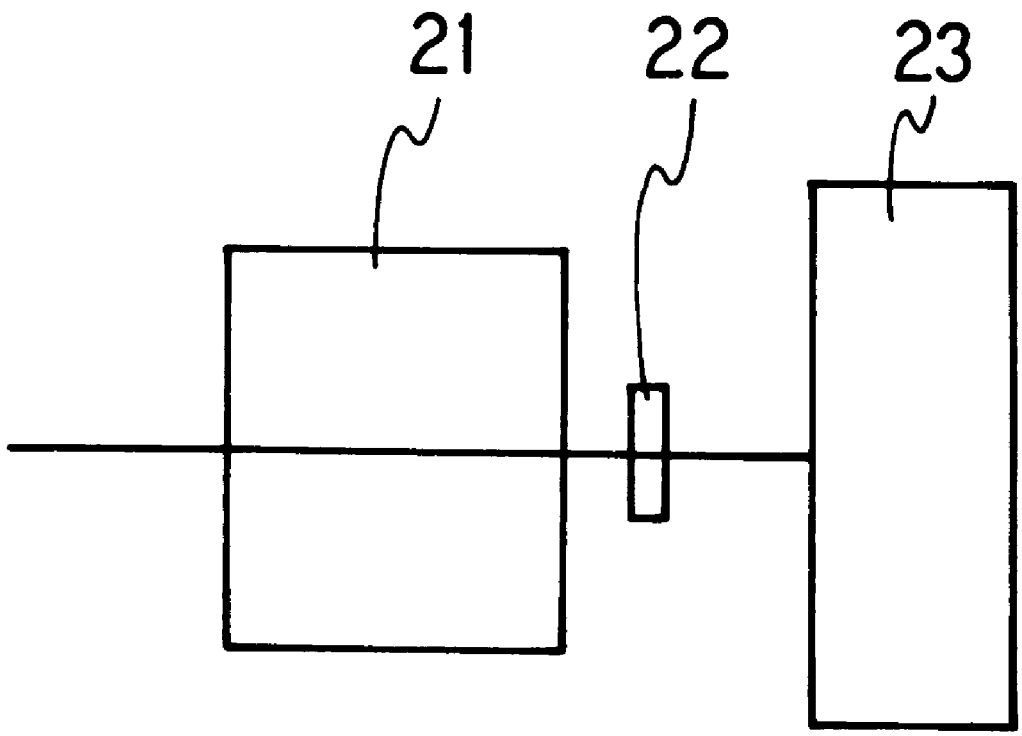
FIG. 30 is a structural drawing of the imaging device according to the fourth embodiment of the present invention.

Next, an imaging device according to a fourth embodiment of the present invention is explained with reference to the drawings. The imaging device shown in FIG. 30 comprises an optical system with a grating element 21, an imaging element 22 and a signal processing circuit 23.

As for the optical system with a grating element 21, any of the optical systems with a grating element according to the first, second or third embodiment of the present invention can be used. An optical system with a grating element according to any of the embodiments of the present invention has a broad spectral range and a wide angle of view, so it is suitable for use in an imaging device. In addition, the scale of the optical system has been reduced compared with the prior art.

Consequently, if an imaging device comprises an optical system with a grating element according to the present invention, the size of the imaging device can be reduced compared to conventional imaging devices and an imaging device with excellent imaging performance can be attained.

According to the present invention as described above, an optical system having a grating element can be provided that displays good imaging performance with corrected chromatic aberration without increasing the number of lenses by employing a lens surface with a diffractive effect (that means by forming a grating element surface on a lens that is part of the optical system). Because this optical system with a grating element is suitable for usage in an imaging device, an imaging device with excellent imaging performance that is smaller than conventional imaging devices can be provided by using the optical system in the image device.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical system with a grating element, comprising a lens with positive refractive power having a concave incident surface and a grating element surface with positive refractive power formed on at least one surface of the lens, the optical system satisfying the equations $$0.05 < \left|\frac{r_2}{r_1}\right| < 0.5, \text{ and } 0.05 < \left|\frac{F}{f_g}\right| < 0.15,$$

wherein $r_1$ is the radius of curvature at the vertex of the incident surface of the lens, $r_2$ is the radius of curvature at the vertex of an outgoing surface of the lens, F is the resultant focal distance of the optical system, and $f_g$ is the focal distance of the grating element.

2. The optical system according to claim 1, wherein at least one surface of the lens is an aspherical surface with a radius of curvature that becomes bigger with increasing distance from the optical axis.

3. The optical system according to claim 2, wherein the grating element surface is formed on the aspherical surface.

4. An optical system with a grating element, comprising a first lens with negative refractive power having a concave outgoing surface, and a second lens with positive refractive power having a convex incident surface, the first lens and the second lens being arranged in that order starting at the object side, and a grating element surface with positive refractive power being formed on at least one surface of the second lens, the optical system satisfying the equation $$0.05 < \left|\frac{F}{f_g}\right| < 0.15,$$

wherein F is the resultant focal distance of the entire optical system, and $f_g$ is the focal distance of the grating element.

5. The optical system according to claim 4, wherein at least one surface of the lenses of the optical system is an aspherical surface with a radius of curvature that becomes bigger with increasing distance from the optical axis.

6. The optical system according to claim 5, wherein the grating element surface is formed on the aspherical surface.

7. The optical system according to claim 6, which satisfies the equation $$0.5 < \left|\frac{f_2}{f_1}\right| < 1.0,$$

wherein $f_1$ is the focal distance of the first lens, and $f_2$ is the focal distance of the second lens.

8. The optical system according to claim 7, wherein the resultant focal distance of the entire optical system can be varied by altering the air space distance between the first and the second lens.

9. The optical system according to claim 8, which satisfies the equation $$1.3 < \left|\frac{f_1}{f_w}\right| < 2.0,$$

wherein $f_1$ is the focal distance of the first lens, and $f_w$ is the resultant focal distance of the entire optical system for the shortest focal distance.

10. An imaging device, comprising
an optical system with a grating element, the optical system having a lens with a concave incident surface and positive refractive power, and a grating element surface with positive refractive power formed on at least one surface of the lens, the optical system satisfying the equations $$0.05 < \left|\frac{r_2}{r_1}\right| < 0.5, \text{ and}$$

$$0.05 < \left|\frac{F}{f_g}\right| < 0.15,$$

wherein $r_1$ is the radius of curvature at the vertex of the incident surface of the lens, $r_2$ is the radius of curvature at the vertex of the outgoing surface of the lens, F is the resultant focal distance of the optical system, and $f_g$ is the focal distance of the grating element, an imaging element for receiving light passing through the optical system and generating an electric signal corresponding to the received light, and a signal processing circuit for processing the electric signal supplied by the imaging element to output an image signal.

11. An imaging device, comprising an optical system with a grating element, having a first lens with a concave outgoing surface and negative refractive power, and a second lens with a convex incident surface and positive refractive power, the first lens and the second lens being arranged in that order starting at the object side, and a grating element surface with positive refractive power being formed on at least one surface of the second lens, the optical system satisfying the equation $$0.05 < \left|\frac{F}{f_g}\right| < 0.15,$$

wherein F is the resultant focal distance of the entire optical system, and $f_g$ is the focal distance of the grating element, an imaging element for receiving light passing through the optical system and generating an electric signal corresponding to the received light, and a signal processing circuit for processing the electric signal supplied by the imaging element to output a signal.

12. An optical system with a grating element, comprising a first lens with negative refractive power having a concave outgoing surface, a second lens with positive refractive power, and a third lens with positive refractive power, the first, second and third lenses being arranged in that order starting at the object side, and a grating element surface with positive refractive power being formed on at least one surface of the lenses, which satisfies the equation $$0.05 < \left|\frac{F}{f_g}\right| < 0.15,$$

wherein F is the resultant focal distance of the entire optical system, and $f_g$ is the focal distance of the grating element.

13. The optical system according to claim 12, wherein at least one surface of the lenses of the optical system is an aspherical surface with a radius of curvature that becomes bigger with increasing distance from the optical axis.

14. The optical system according to claim 13, wherein the grating element surface is formed on the aspherical surface.

15. The optical system according to claim 14, wherein the resultant focal distance of the entire optical system can be varied by altering the air space distance between the first and the second lens.

16. The optical system according to claim 15, which satisfies the equation $$1.3 < \left|\frac{f_1}{f_w}\right| < 2.0,$$

wherein $f_1$ is the focal distance of the first lens, and $f_w$ is the resultant focal distance of the entire optical system for the shortest focal distance.

17. An imaging device, comprising an optical system with a grating element having
a first lens with negative refractive power having a concave outgoing surface, a second lens with positive refractive power, and a third lens with positive refractive power, the first, second and third lenses being arranged in that order starting at the object side, and a grating element surface with positive refractive power being formed on at least one surface of the lenses, the optical system satisfying the equation $$0.05 < \left|\frac{F}{f_g}\right| < 0.15,$$

wherein F is the resultant focal distance of the entire optical system, and $f_g$ is the focal distance of the grating element, an imaging element for receiving light passing through the optical system and generating an electric signal corresponding to the received light, and a signal processing circuit for processing the electric signal supplied by the imaging element to output an image signal.

* * * * *